US008423586B2

(12) United States Patent
Binstock et al.

(10) Patent No.: US 8,423,586 B2
(45) Date of Patent: Apr. 16, 2013

(54) XBRL SERVICE SYSTEM AND METHOD

(75) Inventors: Cliff Binstock, Kirkland, WA (US); Brian Milnes, Mercer Island, WA (US)

(73) Assignee: XBRL Cloud, Inc., Port Townsend, WA (US)

( * ) Notice: Subject to any disclaimer, the term of this patent is extended or adjusted under 35 U.S.C. 154(b) by 91 days.

(21) Appl. No.: 13/091,037

(22) Filed: Apr. 20, 2011

(65) Prior Publication Data

US 2011/0258167 A1   Oct. 20, 2011

Related U.S. Application Data

(60) Provisional application No. 61/326,041, filed on Apr. 20, 2010.

(51) Int. Cl.
G06F 17/30   (2006.01)

(52) U.S. Cl.
USPC .......................................... 707/803

(58) Field of Classification Search .................. None
See application file for complete search history.

(56) References Cited

U.S. PATENT DOCUMENTS

| | | | |
|---|---|---|---|
| 6,970,874 B2 * | 11/2005 | Egilsson et al. | 707/803 |
| 7,668,860 B2 | 2/2010 | Naibo et al. | |
| 2002/0087516 A1 * | 7/2002 | Cras et al. | 707/2 |
| 2006/0004746 A1 * | 1/2006 | Angus et al. | 707/4 |
| 2006/0242624 A1 | 10/2006 | Mueller-Klingspor | |
| 2007/0136326 A1 | 6/2007 | McClement et al. | |
| 2008/0243767 A1 * | 10/2008 | Naibo et al. | 707/2 |
| 2010/0121883 A1 * | 5/2010 | Cutting et al. | 707/791 |
| 2011/0040697 A1 * | 2/2011 | Constantinou et al. | 705/348 |

OTHER PUBLICATIONS

Hoffman C et al., "US GAAP Taxonomy—Tip,s Tricks and Traps," Aug. 2008, http://xbrl.squarespace.com/storage/ugt/UGT-Tips Tricks Traps-2008-08-07.pdf.

* cited by examiner

*Primary Examiner* — Bai D. Vu
(74) *Attorney, Agent, or Firm* — Æon Law; Adam L. K. Philipp

(57) ABSTRACT

Relationships between XBRL hypercubes, including implicit relationships, may be automatically determined based on shared dimensions. Once such relationships are understood, "generic" software (software that is not specific to a particular taxonomy) may be built to provide some or all of the following functionalities: determine, enforce, and/or encourage referential integrity; deduce (graph) ordered relationships between hypercubes; make inferences about those relationships; "join" or "split" hypercubes; create isomorphic and/or homomorphic views of a hypercube for user presentation; and/or assemble and order primary items (attached to hypercubes) in a logical (graph) order.

22 Claims, 14 Drawing Sheets

XBRL SERVICE SYSTEM AND METHOD

CROSS-REFERENCE TO RELATED APPLICATIONS

This application claims the benefit of priority to U.S. Provisional Application No. 61/326,041, filed Apr. 20, 2010, titled "XBRL SERVICE SYSTEM AND METHOD," and naming inventors Cliff Binstock and Brian Milnes. The above-cited application is incorporated herein by reference in its entirety, for all purposes.

FIELD

The present invention relates to eXtensible Business Reporting Language ("XBRL"), and more particularly to systems and methods for processing, presenting, and/or verifying XBRL data.

BACKGROUND

XBRL is an open data standard for financial reporting. XBRL allows information modeling and the expression of semantic meaning commonly required in business reporting. XBRL uses Extensible Markup Language ("XML") syntax. XBRL is commonly used to define and exchange financial information, such as financial statements, corporate action filings, and the like.

In typical usage, XBRL consists of an instance document, containing primarily the business facts being reported, and one or more taxonomies, which capture definitions of individual reporting concepts, certain relationships between concepts, and other semantic meaning.

The current base XBRL specification is at version 2.1 and is fairly well understood by many software and accounting users. Use of the dimensional specification (XBRL Dimensions 1.0) is also fairly prevalent. Dimensions in XBRL are used to structure contextual information for business facts. Multiple dimensions may be defined in a taxonomy using structures called "hypercubes." In many taxonomies, there are concepts with zero dimensions (literally or effectively attached to empty hypercubes). Furthermore, many dimensions have "default" values, which syntactically look like zero dimensions.

However, at the present time, virtually all XBRL users (software or accounting) envision XBRL dimensions fairly simplistically, consisting of multiple independent or unrelated hypercubes. Furthermore, when current XBRL users do understand that relationships exist between the hypercubes, those relationships are typically "hard-coded" in taxonomy-specific ways.

Analogizing the multi-dimensional XBRL model to a relational database model, the current state of the XBRL art uses hypercubes as if they were a set of disconnected tables, with no automatic methods for a computer to understand relationships such as foreign keys between them. Consequently, at the present time, software for creating and manipulating XBRL must generally be "hard-coded" for one particular taxonomy or application.

DESCRIPTION

Figure 1:
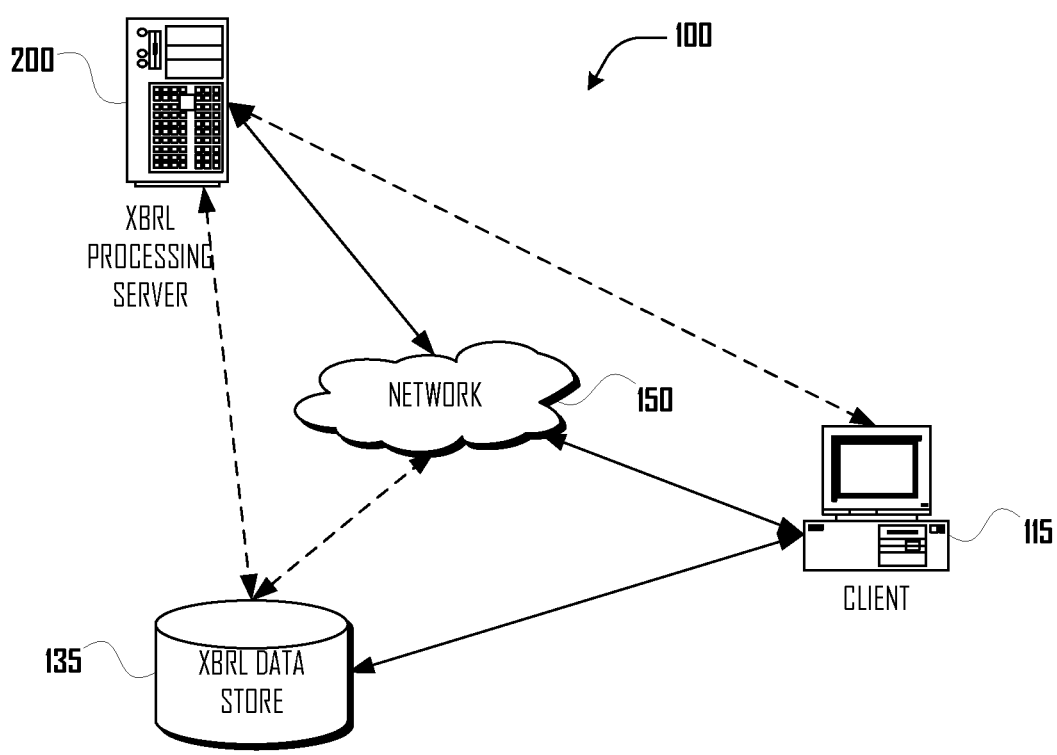
FIG. 1 illustrates an exemplary XBRL processing system in accordance with one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

XBRL's multi-dimensional model may in some cases be (imperfectly) analogized to a relational model, such as is commonly employed in relational databases. For example, a hypercube can be analogized to a relational "table," and in fact, some taxonomies actually annotate hypercubes with the notation, "[Table]." Similarly, an XBRL "dimension" (also sometimes annotated with "[Axis]") can be analogized to similar "keys" in a table. XBRL "dimensions" can be analogized to key columns, while XBRL "primary items" can be analogized to non-key columns. An XBRL "domain" and "member" can also be analogized to a relational-model key value. An XBRL "fact" can be analogized to a relational-model "cell." A relational-model "row" is typically defined by the unique values of it's keys; analogously, an XBRL "row" is defined by the unique values of it's dimensions.

Various embodiments may provide methods for automatically determining that XBRL hypercubes are related and for determining relationships implicit in the hypercubes. Once such relationships are understood, various embodiments may provide additional methods for building "generic" software (i.e., software that is not specific to a particular taxonomy) that may provide some or all of the following functionalities: determine, enforce, and/or encourage referential integrity; deduce (tree) ordered relationships between hypercubes; make inferences about those relationships; "join" or "split" hypercubes; create isomorphic and/or homomorphic views of a hypercube for user presentation; and assemble and order primary items (attached to hypercubes) in a logical (graph) order.

FIG. 1 illustrates an exemplary XBRL processing system 100 in which a client device 115 and an XBRL processing server 200 are connected to a network 150. Additionally, client device 115 is connected to an XBRL data store 135, either locally, via an optional connection to network 150, or via another connection (not shown). In some embodiments, XBRL processing server 200 may also be connected to XBRL data store 135. In some embodiments, XBRL data store 135 may comprise a local and/or remote database; a local and/or remote storage medium connected via a storage area network ("SAN"), a high speed serial bus, and/or via other suitable communication technology; a local and/or remote business intelligence system; and the like. In some embodiments, some or all of XBRL processing server 200, client device 115, and/or XBRL data store 135 may be incorporated into a single logical or physical device.

In various embodiments, network 150 may include the Internet, a local area network ("LAN"), a wide area network ("WAN"), and/or other data network. In many embodiments, there may be multiple client devices 115, multiple XBRL data stores 135, and/or multiple XBRL processing servers 200.

Figure 2:
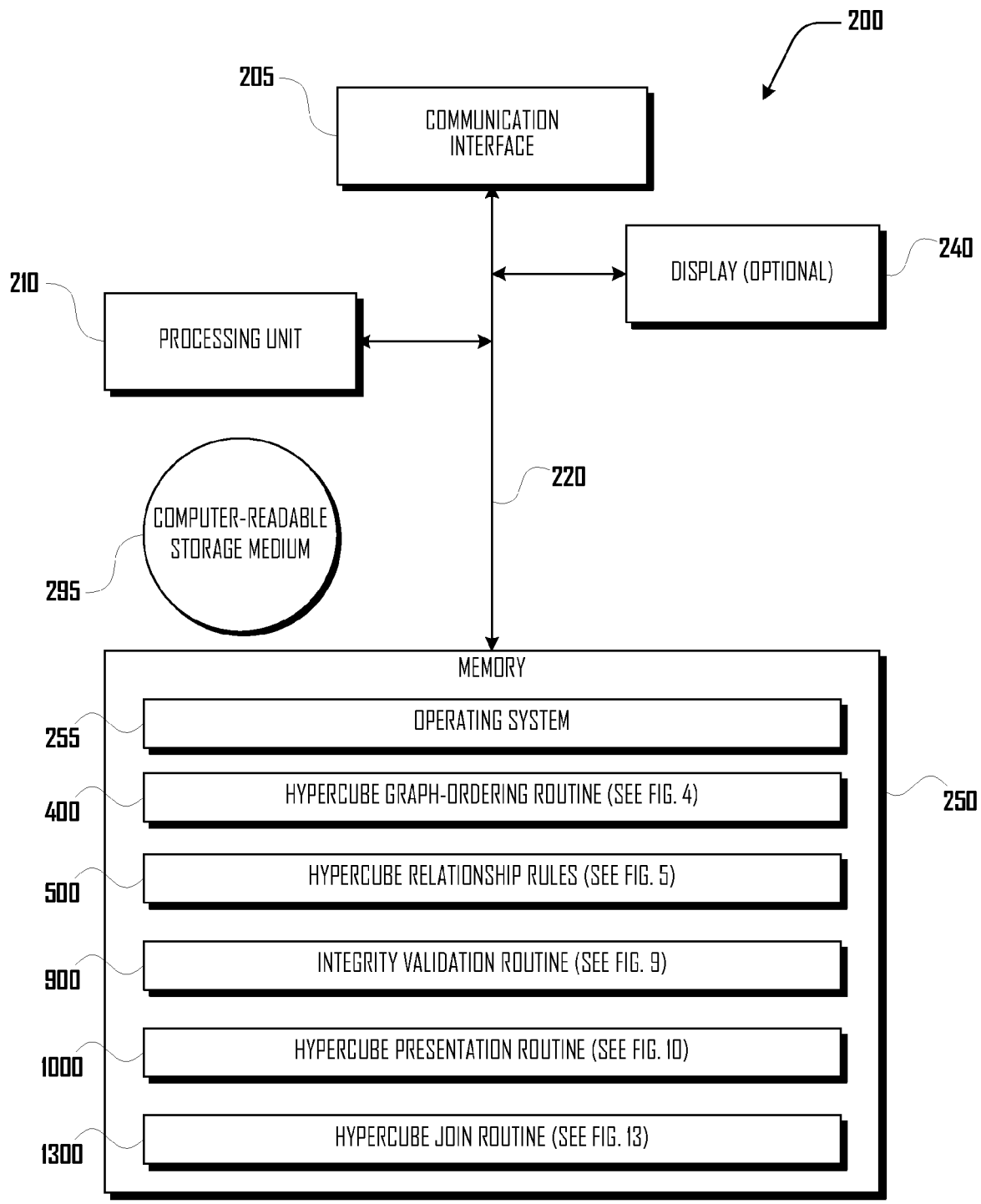
FIG. 2 illustrates several components of an exemplary XBRL processing server in accordance with one embodiment.

FIG. 2 illustrates several components of an exemplary XBRL processing server 200. In some embodiments, XBRL processing server 200 may include many more components than those shown in FIG. 2. However, it is not necessary that all of these generally conventional components be shown in order to disclose an illustrative embodiment. As shown in FIG. 2, the XBRL processing server 200 includes a communication interface 205 for connecting to, e.g., the network 150.

The XBRL processing server 200 also includes a processing unit 210, a memory 250, and an optional display 240, all interconnected along with the communication interface 205 via a bus 220. The memory 250 generally comprises a random access memory ("RAM"), a read only memory ("ROM"), and a permanent mass storage device, such as a disk drive. The memory 250 stores program code for a hypercube graph-ordering subroutine 400, hypercube relationship rules 500, an integrity validation routine 900, a hypercube presentation routine 1000, and a hypercube join routine 1300. In addition, the memory 250 also stores an operating system 255. These software components may be loaded from a non-transient computer readable storage medium 295, on which the software components are tangibly embodied, into memory 250 of the XBRL processing server 200 using a drive mechanism (not shown) associated with a computer readable storage medium, such as a floppy disc, tape, DVD/CD-ROM drive, memory card, or the like. In some embodiments, software components may also be loaded via the communication interface 205, rather than via a computer readable storage medium 295.

Although an exemplary XBRL processing server 200 has been described that generally conforms to conventional general purpose computing devices, an XBRL processing server 200 may be any of a great number of devices capable of communicating with the network 150 and/or client device 115, for example, a personal computer, a game console, a set-top box, a handheld computer, a cell phone, or any other device that is capable of processing XBRL data.

Figure 3:
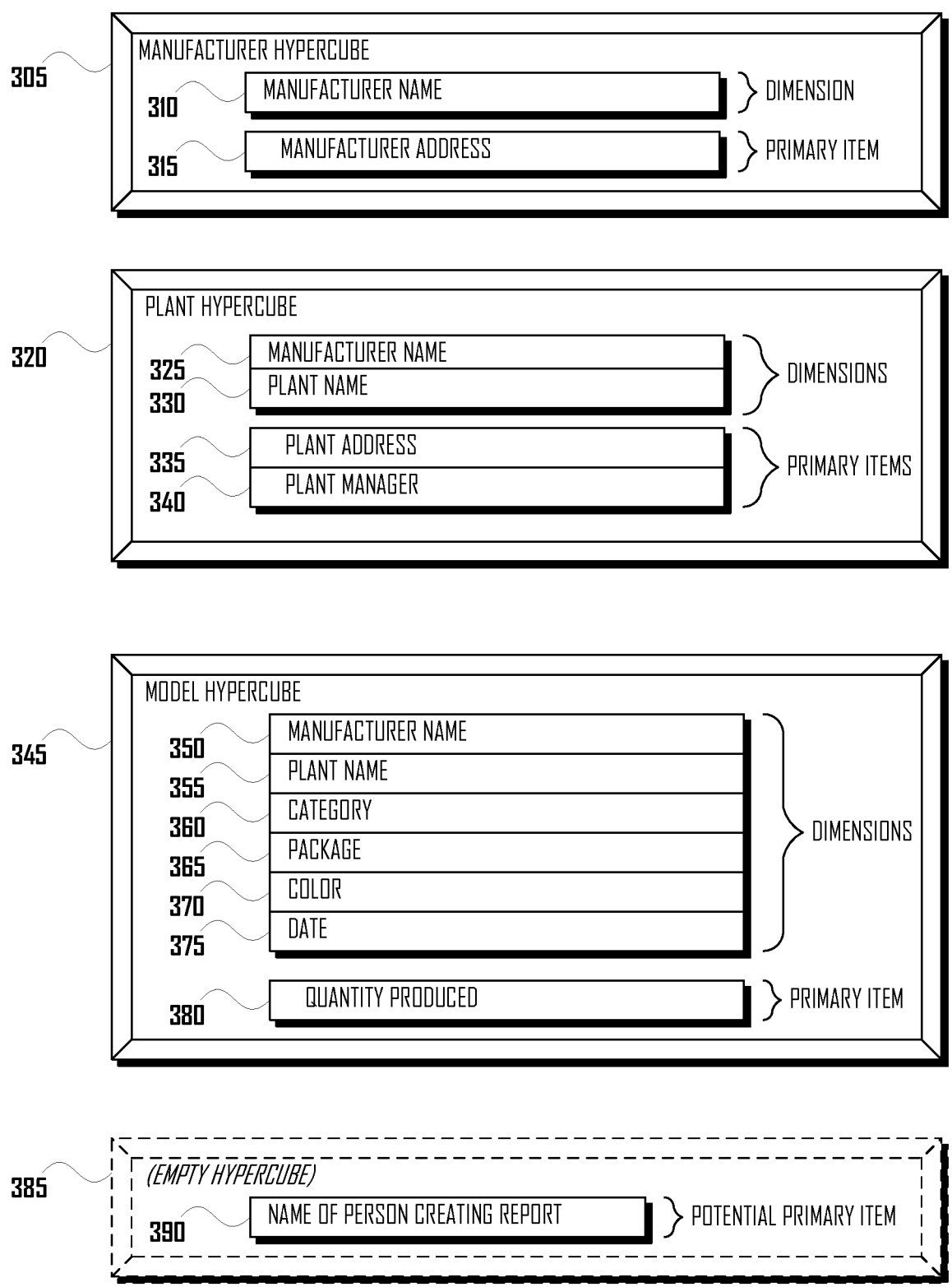
FIG. 3 illustrates elements comprising a network of hypercubes in accordance with one embodiment.

FIG. 3 illustrates elements comprising a network of exemplary hypercubes that will be used to illustrate various features and processes set out below. For purposes of such illustration, this disclosure will use an exemplary scenario using data related to a number of auto manufacturers. In the illustrative scenario, each Manufacturer has a set of Plants; each Plant manufactures a set of Models, each Model is in a Category (e.g., sedan, wagon, coupe, SUV, pickup); multiple manufacturers or plants may share Categories.

Figure 14:
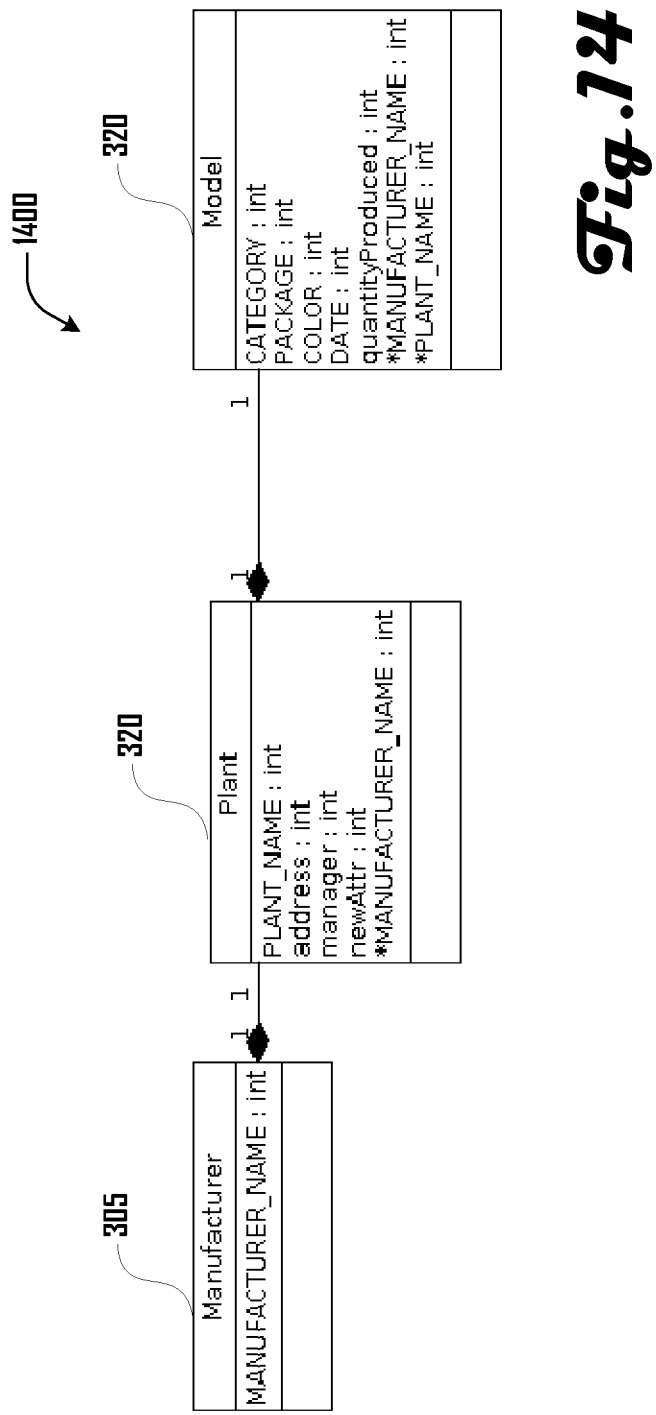
FIG. 14 illustrates a Unified Modeling Language diagram of relationships between hypercubes in accordance with one embodiment.

The exemplary hypercubes used herein to illustrate the exemplary scenario include a Manufacturer Hypercube 305, a Plant Hypercube 320, and a Model Hypercube 345. The Manufacturer Hypercube 305 includes a Manufacturer Name dimension 310 and a Manufacturer Address primary item 315. The Plant Hypercube 320 includes the following dimensions: Manufacturer Name 325 and Plant Name 330. The Plant Hypercube 320 includes the following primary items: Plant Address 335 and Plant Manager 340. The Model Hypercube 345 includes the following dimensions: Manufacturer Name 325, Plant Name 330, Category 360, Package 365, Color 370, and Date 375. The Model Hypercube 345 includes a Quantity Produced primary item 380. FIG. 14 also illustrates a Unified Modeling Language diagram 1100 of relationships between hypercubes 305, 320, and 345 that may be determined in accordance with one embodiment.

Also illustrated is an Empty Hypercube 385 including a potential primary item: in this case, the name of the person creating the report 390. As discussed herein, any concept (potential primary item) that is not associated with any hypercube is considered to be functionally equivalent to an empty hypercube.

Tables 1-3, below, include sets of exemplary data for hypercubes 305, 320, and 345, which will be used throughout this disclosure for illustration purposes.

TABLE 1

Manufacturer Hypercube Data

| Manufacturer | Primary Address |
| --- | --- |
| Evil Electrics | 20 Current Drive |
| Goulish Gassers | 1 Smog Lane |

TABLE 2

Plant Hypercube Data

| Manufacturer | Plant Name | Plant Address | Plant Manager |
| --- | --- | --- | --- |
| Evil Electrics | Lightning | 1 Georgia Way | Anne |
| Evil Electrics | Amped | 100 Nowhere | Frank |
| Goulish Gassers | Brownfield | 1 Pavement Drive | Alice |
| Goulish Gassers | Greenland | 1 Concrete Heaven | Joe |
| Goulish Gassers | Brownfield | 1 Pavement Drive | Alice |

TABLE 3

Model Hypercube Data

| Manufacturer | Plant Name | Category | Model | Package | Color | Date | Quantity Produced |
|---|---|---|---|---|---|---|---|
| Evil Electrics | Lightning | Coupe | Flash | DX | White | Oct. 31, 2010 | 100 |
| Evil Electrics | Lightning | Coupe | Flash | DX | White | Nov. 30, 2010 | 115 |
| Evil Electrics | Lightning | Coupe | Flash | DX | White | Dec. 31, 2010 | 88 |
| Evil Electrics | Lightning | Coupe | Flash | QX | White | Oct. 31, 2010 | 100 |
| Evil Electrics | Lightning | Coupe | Flash | QX | White | Nov. 30, 2010 | 115 |
| Evil Electrics | Lightning | Coupe | Flash | QX | White | Dec. 31, 2010 | 88 |
| Evil Electrics | Lightning | Coupe | Flash | DX | Green | Oct. 31, 2010 | 100 |
| Evil Electrics | Lightning | Coupe | Flash | DX | Green | Nov. 30, 2010 | 115 |
| Evil Electrics | Lightning | Coupe | Flash | DX | Green | Dec. 31, 2010 | 88 |
| Evil Electrics | Amped | Coupe | Flash | DX | White | Oct. 31, 2010 | 200 |
| Evil Electrics | Amped | Coupe | Flash | DX | White | Nov. 30, 2010 | 215 |
| Evil Electrics | Amped | Coupe | Flash | DX | White | Dec. 31, 2010 | 188 |
| Evil Electrics | Amped | Coupe | Flash | QX | White | Oct. 31, 2010 | 200 |
| Evil Electrics | Amped | Coupe | Flash | QX | White | Nov. 30, 2010 | 215 |
| Evil Electrics | Amped | Coupe | Flash | QX | White | Dec. 31, 2010 | 188 |
| Evil Electrics | Amped | Coupe | Flash | DX | Green | Oct. 31, 2010 | 200 |
| Evil Electrics | Amped | Coupe | Flash | DX | Green | Nov. 30, 2010 | 215 |
| Evil Electrics | Amped | Coupe | Flash | DX | Green | Dec. 31, 2010 | 188 |
| Goulish Gassers | Brownfield | Coupe | RoadCruiser | Bruiser | White | Oct. 31, 2010 | 100 |
| Goulish Gassers | Brownfield | Coupe | RoadCruiser | Bruiser | White | Nov. 30, 2010 | 115 |
| Goulish Gassers | Brownfield | Coupe | RoadCruiser | Bruiser | White | Dec. 31, 2010 | 88 |
| Goulish Gassers | Brownfield | Coupe | RoadCruiser | Snoozer | White | Oct. 31, 2010 | 100 |
| Goulish Gassers | Brownfield | Coupe | RoadCruiser | Snoozer | White | Nov. 30, 2010 | 115 |
| Goulish Gassers | Brownfield | Coupe | RoadCruiser | Snoozer | White | Dec. 31, 2010 | 88 |
| Goulish Gassers | Brownfield | Coupe | RoadCruiser | Bruiser | Green | Oct. 31, 2010 | 100 |
| Goulish Gassers | Brownfield | Coupe | RoadCruiser | Bruiser | Green | Nov. 30, 2010 | 115 |
| Goulish Gassers | Brownfield | Coupe | RoadCruiser | Bruiser | Green | Dec. 31, 2010 | 88 |
| Goulish Gassers | Greenland | Coupe | RoadCruiser | Bruiser | White | Oct. 31, 2010 | 200 |
| Goulish Gassers | Greenland | Coupe | RoadCruiser | Bruiser | White | Nov. 30, 2010 | 215 |
| Goulish Gassers | Greenland | Coupe | RoadCruiser | Bruiser | White | Dec. 31, 2010 | 188 |
| Goulish Gassers | Greenland | Coupe | RoadCruiser | Snoozer | White | Oct. 31, 2010 | 200 |
| Goulish Gassers | Greenland | Coupe | RoadCruiser | Snoozer | White | Nov. 30, 2010 | 215 |
| Goulish Gassers | Greenland | Coupe | RoadCruiser | Snoozer | White | Dec. 31, 2010 | 188 |
| Goulish Gassers | Greenland | Coupe | RoadCruiser | Bruiser | Green | Oct. 31, 2010 | 200 |
| Goulish Gassers | Greenland | Coupe | RoadCruiser | Bruiser | Green | Nov. 30, 2010 | 215 |
| Goulish Gassers | Greenland | Coupe | RoadCruiser | Bruiser | Green | Dec. 31, 2010 | 188 |
| Goulish Gassers | Brownfield | Pickup | SnowMaster | 3500 | Black | Oct. 31, 2010 | 100 |
| Goulish Gassers | Brownfield | Pickup | SnowMaster | 3500 | Black | Nov. 30, 2010 | 115 |
| Goulish Gassers | Brownfield | Pickup | SnowMaster | 3500 | Black | Dec. 31, 2010 | 88 |
| Goulish Gassers | Brownfield | Pickup | SnowMaster | 3500 | Black | Oct. 31, 2010 | 100 |
| Goulish Gassers | Brownfield | Pickup | SnowMaster | 3500 | Black | Nov. 30, 2010 | 115 |
| Goulish Gassers | Brownfield | Pickup | SnowMaster | 3500 | Black | Dec. 31, 2010 | 88 |
| Goulish Gassers | Brownfield | Pickup | SnowMaster | 3500 | Black | Oct. 31, 2010 | 100 |
| Goulish Gassers | Brownfield | Pickup | SnowMaster | 3500 | Black | Nov. 30, 2010 | 115 |
| Goulish Gassers | Brownfield | Pickup | SnowMaster | 3500 | Black | Dec. 31, 2010 | 88 |

Tables 1-3, as depicted above, also illustrate simple, single-hypercube-based reports or presentations, such as could be derived according to methods previously known in the art. For example, Table 2 illustrates a simple list of plants, in which detail about the manufacturer (e.g., the primary address) is missing. Similarly, Table 3 illustrates a simple list of models, in which detail about the plant (e.g., the plant address and manager) and manufacturer (e.g., the primary address) is missing.

TABLE 4

Production Breakdown by Model and Data (Model Hypercube)

| | | | | Date | | | Grand |
|---|---|---|---|---|---|---|---|
| Sum of Quantity Produced | | | | | | | |
| Manufacturer | Model | Package | Plant Name | Oct. 31, 2010 | Nov. 30, 2010 | Dec. 31, 2010 | Total |
| Evil Electrics | Flash | DX | Amped | 400 | 430 | 376 | 1206 |
| | | | Lightning | 200 | 230 | 176 | 606 |
| | | DX Total | | 600 | 660 | 552 | 1812 |

TABLE 4-continued

Production Breakdown by Model and Data (Model Hypercube)

| Manufacturer | Model | Package | Plant Name | Sum of Quantity Produced | | | Grand Total |
|---|---|---|---|---|---|---|---|
| | | | | Date | | | |
| | | | | Oct. 31, 2010 | Nov. 30, 2010 | Dec. 31, 2010 | |
| | | QX | Amped | 200 | 215 | 188 | 603 |
| | | | Lightning | 100 | 115 | 88 | 303 |
| | | QX Total | | 300 | 330 | 276 | 906 |
| | Flash Total | | | 900 | 990 | 828 | 2718 |
| Evil Electrics Total | | | | 900 | 990 | 828 | 2718 |
| Goulish Gassers | RoadCruiser | Bruiser | Brownfield | 200 | 230 | 176 | 606 |
| | | | Greenland | 400 | 430 | 376 | 1206 |
| | | Bruiser Total | | 600 | 660 | 552 | 1812 |
| | | Snoozer | Brownfield | 100 | 115 | 88 | 303 |
| | | | Greenland | 200 | 215 | 188 | 603 |
| | | Snoozer Total | | 300 | 330 | 276 | 906 |
| | RoadCruiser Total | | | 900 | 990 | 828 | 2718 |
| | SnowMaster | 3500 | Brownfield | 300 | 345 | 264 | 909 |
| | | 3500 Total | | 300 | 345 | 264 | 909 |
| | SnowMaster Total | | | 300 | 345 | 264 | 909 |
| Goulish Gassers Total | | | | 1200 | 1335 | 1092 | 3627 |
| Grand Total | | | | 2100 | 2325 | 1920 | 6345 |

Similarly, Table 4, above, sets out a slightly more complex single-hypercube-based report, such as could also be derived according to methods previously known in the art. Once again, detail about the manufacturer and plant is missing.

Figure 4:
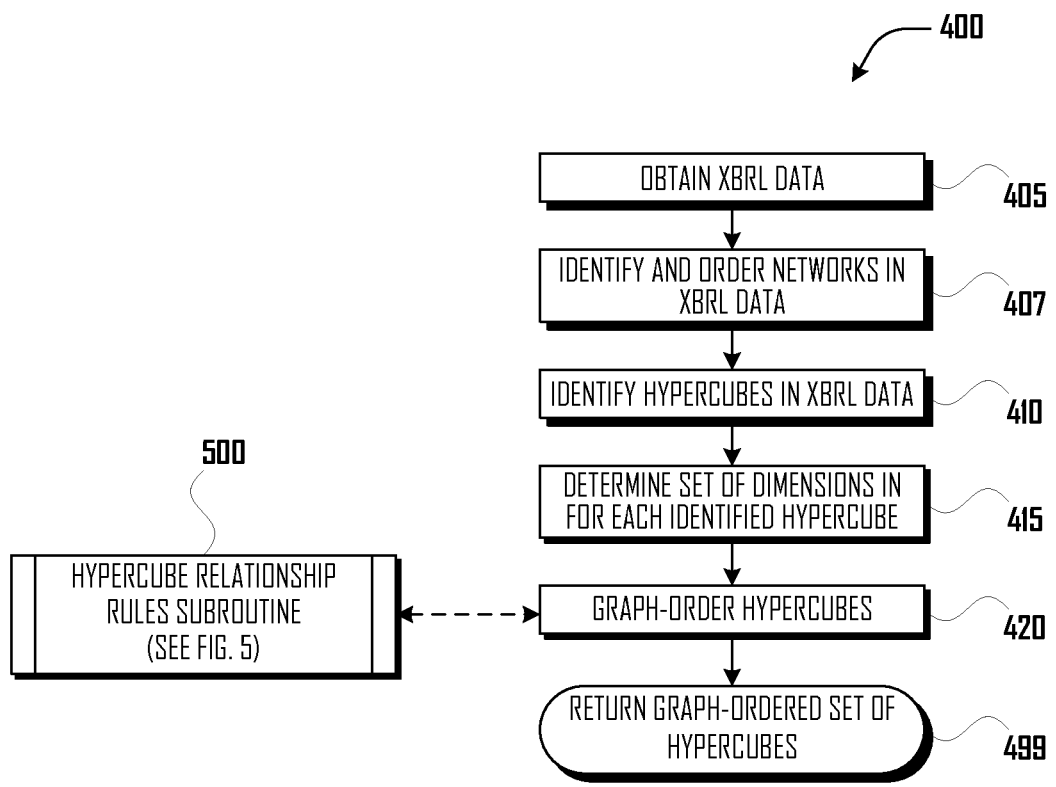
FIG. 4 illustrates a hypercube tree-ordering subroutine in accordance with one embodiment.

FIG. 4 illustrates a hypercube tree-ordering subroutine 400 in accordance with one embodiment. According to various embodiments disclosed herein, it may be possible to automatically generate a hierarchical list or ordered graph (frequently, a tree) of hypercubes by automatically determining relationships between dimensions in individual hypercubes. Once such relationships have been determined, it may be possible to automatically generate relational, multi-hypercube reports such as that illustrated below in Table 5.

TABLE 5

Relational View of Data from Manufacturer, Plant, and Model hypercubes

| | | | | | | | 10/31/09 | 11/30/09 | 12/31/09 |
|---|---|---|---|---|---|---|---|---|---|
| Evil Electrics | | | | | | | | | |
| | Address | 20 Current Drive | | | | | | | |
| | Plants | | | | | | | | |
| | | Name | Lightning | | | | | | |
| | | Address | 1 Georgia Way | | | | | | |
| | | Manager | Anne | | | | | | |
| | | Models | | | | | | | |
| | | | Flash | Coupe | QX | White | 100 | 115 | 88 |
| | | | Flash | Coupe | QX | White | 100 | 115 | 88 |
| | | | Flash | Coupe | DX | Green | 100 | 115 | 88 |

In block 405, subroutine 400 obtains a block of XBRL data. In some embodiments, subroutine 400 may be performed by XBRL processing server 200, and the block of XBRL data may be provided by client device 115. In other embodiments, subroutine 400 may be performed by an XBRL processing component on client device 115, and XBRL data may be loaded from one or more local or remote files and/or may be obtained from a data store housing business data.

In block 407, subroutine 400 identifies one or more networks in the block of XBRL data and orders the identified networks. In one embodiment, networks are ordered alphanumerically according to their names.

In block 410, subroutine 400 identifies one or more hypercubes in the block of XBRL data, including empty hypercubes and/or inferred hypercubes (if any). For example, if XBRL data corresponding to Tables 1-3, above, were obtained in block 405, subroutine 400 may identify hypercubes 305, 320, and 345 from the data.

In block 415, subroutine 400 determines a set of zero or more dimensions for each identified hypercube. Using the exemplary XBRL data corresponding to Tables 1-3, above, subroutine 400 may determine that Manufacturer Hypercube 305 has one dimension, that Plant Hypercube 320 has two dimensions, and that Model Hypercube 345 has six dimensions.

In block 420, subroutine 400 orders the hypercubes into a graph (in many cases, a tree) of ordered hypercubes, repeatedly using hypercube relationship rules subroutine 500 (see FIG. 5, discussed below). Subroutine 400 ends in block 499, returning the ordered tree (or graph) of hypercubes.

Figure 5:
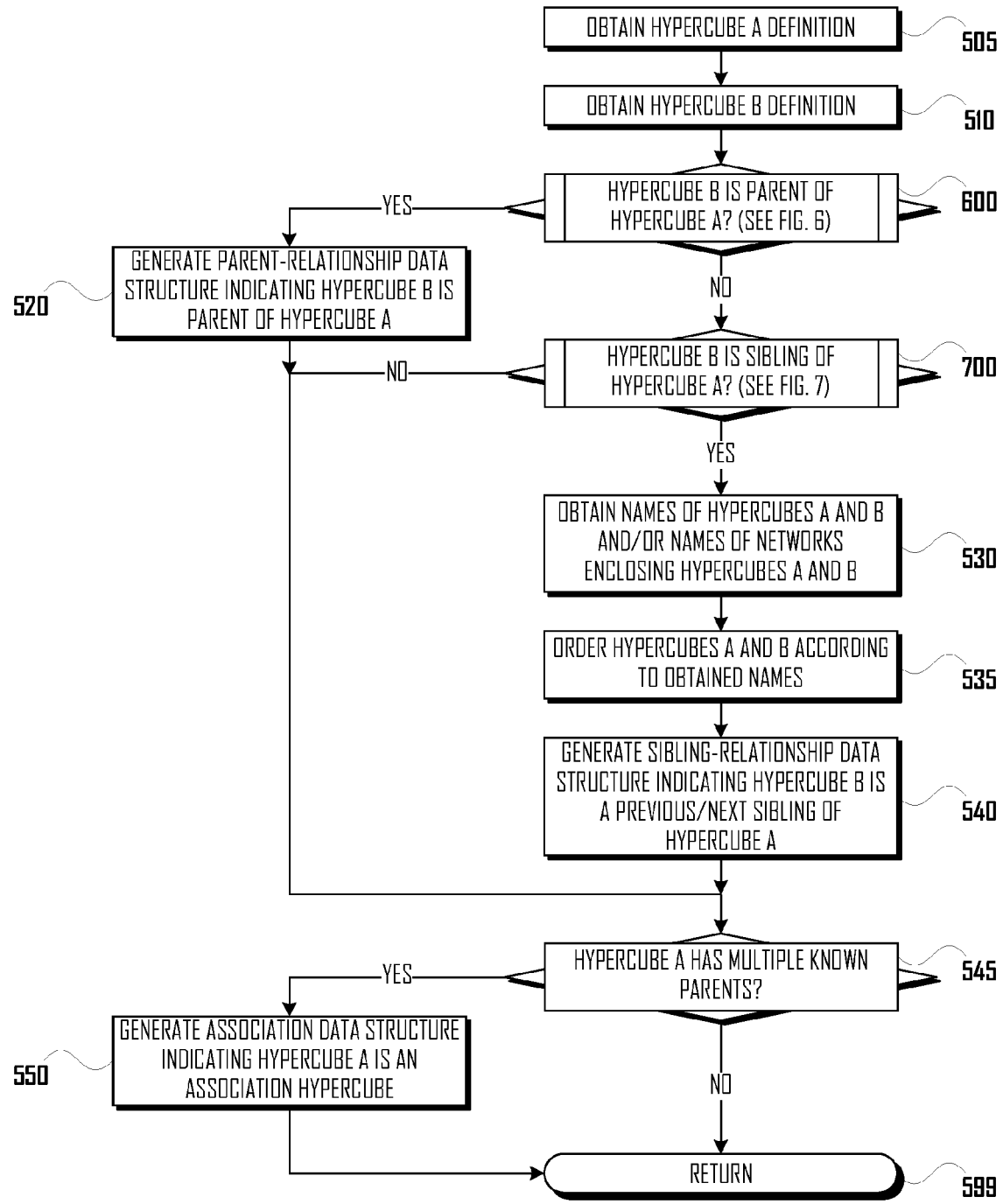
FIG. 5 illustrates an exemplary set of relationship rules in accordance with one embodiment.

FIG. 5 illustrates an exemplary relationship rules subroutine 500, which automatically determines various relationships between a given pair of hypercubes, in accordance with one embodiment. Based on such relationships, a tree or graph of ordered hypercubes may be determined by following parent-child relationships as set out below. Generally speaking, one or more hypercubes at the root of the graph generally have the fewest (often zero) dimensions, while hypercubes at the leaves generally have the most dimensions. In many embodiments, a root hypercube is typically an empty hypercube.

In other embodiments, more, fewer, and/or different relationship rules may be employed. In some embodiments, parent/child decision rules 600 may be used separately from sibling decision rules 700.

In blocks 505 and 510, subroutine 500 obtains definitions for hypercubes "A" and "B," respectively. For example, in one embodiment, subroutine 500 may obtain and parse a definitions linkbase associated with an XBRL network. In many cases, one or both of hypercubes A and B may be explicitly defined. Alternately, in some cases, one or both of hypercubes A and B may be empty hypercubes (cf. Empty Hypercube 385, discussed above), implied by an "unconstrained" potential primary item (one not associated with an explicit hypercube). In such cases, subroutine 500 may generate, at least in transient memory, a data structure representing the implied, empty hypercube.

In decision subroutine 600, subroutine 500 determines whether hypercube B is a parent of hypercube A. If so, then in block 520, subroutine 500 generates a parent-relationship data structure indicating that hypercube B is a parent of hypercube A. In various embodiments, generating the parent-relationship data structure may include generating a pointer, key, or other reference to hypercube B, and associating the pointer, key, or other reference with hypercube A.

On the other hand, if in decision subroutine 600, subroutine 500 does not determines that hypercube B is a parent of hypercube A, then in decision subroutine 700, subroutine 500 determines whether hypercubes A and B are siblings with respect to some parent hypercube. If so, then in block 530, subroutine 500 obtains the names of hypercubes A and B, if any (implied/empty hypercubes have no names) and/or obtains the names of networks enclosing hypercubes A and B. If a sibling relationship was determined for hypercubes 505 and 510, in some embodiments, rules 500 may further order the sibling hypercubes 505 and 510 according to the name of the network and/or name of the hypercube, if any (implied empty hypercubes, for example, have no name). In some embodiments, subroutine 500 may generate a combined or concatenated name based on some or all of the network and hypercube names for each hypercube.

In block 535, subroutine 500 orders hypercubes A and B alphanumerically, according to the names obtained in block 530. Some embodiments of subroutine 500 may omit sibling-ordering blocks 530 and 535; other embodiments may use a non-alphanumeric basis to order sibling hypercubes A and B.

In block 540, subroutine 500 generates a sibling-relationship data structure indicating that hypercube B is a previous sibling of hypercube A (if hypercube B sorts before hypercube A alphanumerically) or indicating that hypercube B is a next sibling of hypercube A (if hypercube B sorts after hypercube A alphanumerically). In various embodiments, generating the sibling-relationship data structure may include generating a pointer, key, or other reference to hypercube B, and associating the pointer, key, or other reference with hypercube A.

In some embodiments, hypercubes A may also be tested in decision block 545 to determine whether it is an "Association Hypercube." A hypercube is an Association Hypercube if it has multiple parents. In some embodiments, Association Hypercubes may be useful for associating loosely connected items (i.e., for aggregation). For example, suppose the exemplary XBRL network further included an Automobile Hypercube and an Automobile Owner Hypercube. In such a case, every individual Automobile could be tied to the appropriate Model. Each Automobile may optionally also be tied to an Automobile Owner, e.g., by an Automobile-Owner Association Hypercube. In this supposition, the Automobile Hypercube has a one-to-many relationship with the Plant Hypercube (each Plant produces a set of Automobiles), but the Automobile Hypercube has a many-to-many relationship with the Automobile Owner Hypercube (each Owner can have zero or more Automobiles; each Automobile can have zero or more Owners).

If subroutine 500 determines in decision block 545 that hypercube A is an Association Hypercube, then in block 550, subroutine 500 generates an association data structure indicating that hypercube A is an association hypercube. In various embodiments, generating the sibling-relationship data structure may include generating pointers, keys, or other references to two or more parent hypercubes, and associating the pointers, keys, or other references with hypercube A.

Having determined whether hypercube B is a parent or sibling of hypercube A and whether hypercube A is an association hypercube, and having generated data structures as appropriate to such determinations, subroutine 500 ends in block 599, returning to the caller.

Figure 6:
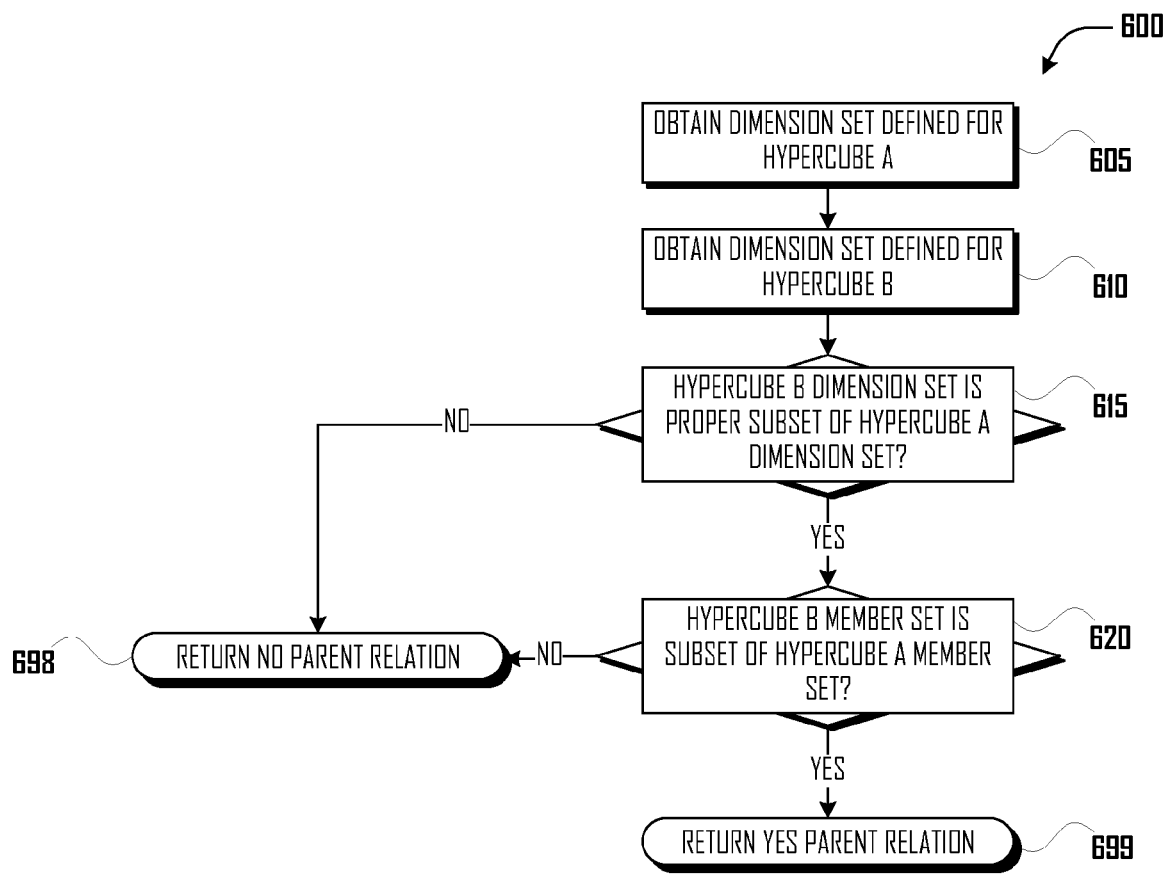
FIG. 6 illustrates a subroutine for determining whether a given hypercube B is a parent of a given hypercube A, based on the definitions of the hypercubes, in accordance with one embodiment.

FIG. 6 illustrates a subroutine 600 for determining whether a given hypercube B is a parent of a given hypercube A, based on the definitions of the hypercubes, in accordance with one embodiment. More specifically, subroutine 600 determines whether hypercube B is a parent of hypercube A, based on the presence or absence of dimensions (including dimensional members) shared by both hypercubes.

In one embodiment, a hypercube is deemed the child of another if it has exactly the same dimensions (including dimensional members), plus additional dimensions. Accordingly, if hypercube B were Manufacturer Hypercube 305 and hypercube A were Plant Hypercube 320, then hypercube B (Manufacturer Hypercube 305) would be a parent of hypercube A (Plant Hypercube 320) because they share the Manufacturer Name 325 dimension and Plant Hypercube 320 further includes the Plant Name 330 dimension. Similarly, Plant Hypercube 320 would be a parent of Model Hypercube 345 because they share the Manufacturer Name 350 and Plant Name 355 dimensions and Model Hypercube 345 further includes additional dimensions 360, 365, 370, and 375.

In blocks 605 and 610, subroutine 600 obtains sets of dimensions that are respectively defined for hypercubes A and B. In decision block 615, subroutine 600 determines whether hypercube B's dimension set is a proper subset of hypercube A's dimension set. In other words, in decision block 615, subroutine 600 determines whether hypercube A includes the same dimensions as hypercube B, plus additional dimensions. If not, then subroutine 600 ends in block 698, returning a "no parent relation" indication to the caller.

On the other hand, if in decision block 615, subroutine 600 determines that hypercube B's dimension set is a proper subset of hypercube A's dimension set, then in decision block 620, subroutine 600 determines whether hypercube A's set of dimensional members is a subset of hypercube B's set of dimensional members (i.e., whether hypercube B includes all dimensional members of hypercube A). If so, then subroutine 600 ends in block 699, returning a "yes parent relation" indication to the caller. Otherwise, subroutine 600 ends in block 698, returning a "no parent relation" indication to the caller.

Figure 7:
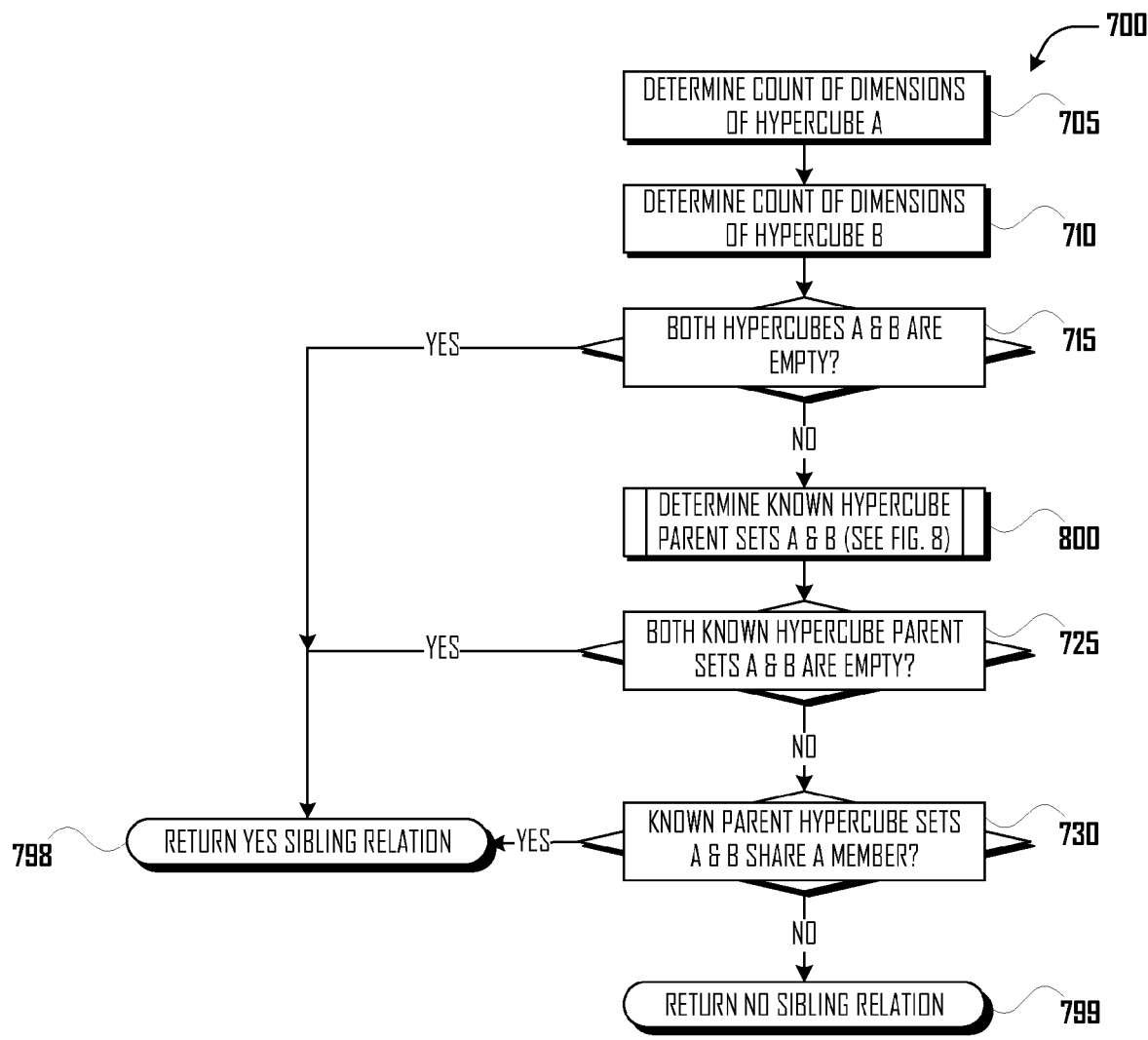
FIG. 7 illustrates a subroutine for determining whether a given hypercube B is a sibling of a given hypercube A with respect to some parent hypercube, in accordance with one embodiment.

FIG. 7 illustrates a subroutine 700 for determining whether a given hypercube B is a sibling of a given hypercube A with respect to some parent hypercube, in accordance with one embodiment. In blocks 705 and 710, subroutine 700 respectively determines counts of the dimensions defined for hypercubes A and B. For example, in one embodiment, subroutine 700 would determine a count of "1" for hypercube 305, a count of "2" for hypercube 320, a count of "0" for hypercube 385, and so on.

In decision block 715, subroutine 700 determines whether hypercubes A and B each have zero defined dimensions (i.e., whether both hypercubes A and B are empty hypercubes). If so, they are sibling root hypercubes, and subroutine 700 returns in block 798, returning a "yes sibling relation" indication.

Otherwise, if one or both of hypercubes A and B each have one or more defined dimensions, then in subroutine block 800 (see FIG. 8, discussed below), subroutine 700 determines sets of known parent hypercubes of hypercubes A and B, respectively.

If hypercubes A and B have known parents, a sibling relationship may be further determined by comparing the parents of hypercubes A and B in blocks 725 and 730. In one embodiment, hypercubes A and B are siblings if they share the same parent or if neither of them has a parent (for example, in many cases, there are one or more root siblings that have no parents). Sibling hypercubes share some of their dimensions and members, but may also have individually distinct ones. In some embodiments, hypercubes A and B can be siblings by virtue of an implied parent (for example, hypercubes A and B might share two dimensions, but no hypercube is defined having just those two dimensions).

Accordingly, in block 725, subroutine 700 determines whether both of the sets of known parent hypercubes of hypercubes A and B are empty (include zero parent hypercubes). If so, then hypercubes A and B may be root siblings, and subroutine 700 returns in block 798, returning a "yes sibling relation" indication.

Otherwise, if one or both of the sets of known parent hypercubes of hypercubes A and B are non-empty, then in decision block 730, subroutine 700 determines whether hypercubes A and B have a common or shared parent hypercube. Put another way, in decision block 730, subroutine 700 determines whether there is a non-empty intersection set of the sets of known parent hypercubes of hypercubes A and B. If so, then hypercubes A and B are siblings with respect to the common or shared parent, and subroutine 700 returns in block 798, returning a "yes sibling relation" indication.

Otherwise, if hypercubes A and B do not have a common parent hypercube, then subroutine 700 returns in block 799, returning a "no sibling relation" indication.

Figure 8:
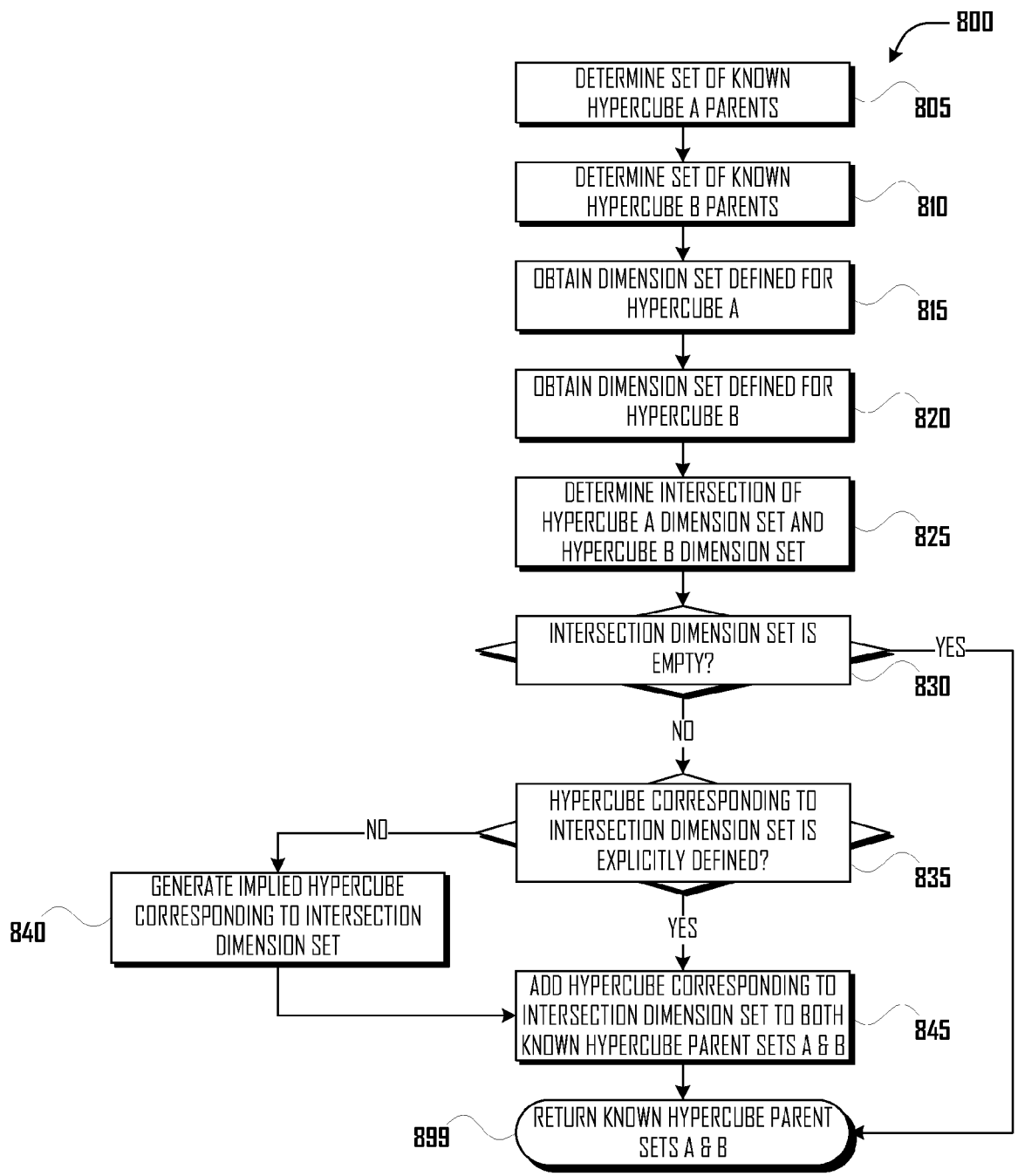
FIG. 8 illustrates a subroutine for respectively determining sets of known parent hypercubes of given hypercubes A and B, in accordance with one embodiment.

FIG. 8 illustrates a subroutine 800 for respectively determining sets of known parent hypercubes of given hypercubes A and B, in accordance with one embodiment. In blocks 805 and 810, subroutine 800 respectively determines sets if zero or more parent hypercubes, which may have previously been identified for hypercubes A and B (e.g., by subroutine 600, discussed above).

In blocks 812 and 820, subroutine 800 obtains sets of dimensions that are respectively defined for hypercubes A and B. In block 825, subroutine 800 determines an intersection set of the sets of dimensions of hypercubes A and B. In decision block 830, subroutine 800 determines whether the dimensional intersection set is empty, or whether hypercubes A and B have at least one dimension in common. If the dimensional intersection set is empty (hypercubes A and B have no dimensions in common), then subroutine 800 ends in block 899, returning the sets of known hypercube parents A and B that were determined in blocks 805 and 810, respectively.

Otherwise, if the dimensional intersection set is non-empty (hypercubes A and B have at least one dimension in common), then in decision block 835, subroutine 800 determines whether a hypercube corresponding to the shared dimension(s) is explicitly defined. If so, then in block 845, subroutine 800 adds the explicitly defined hypercube to the sets of known hypercube parents A and B that were determined in blocks 805 and 810, respectively. Subroutine 800 then ends in block 899, returning the modified sets of known hypercube parents A and B.

Otherwise, if no hypercube corresponding to the shared dimension(s) is explicitly defined, then in block 840, subroutine 800 generates a data structure corresponding to an implied hypercube corresponding to the shared dimension(s). Then, in block 845, subroutine 800 adds the implied hypercube to the sets of known hypercube parents A and B that were determined in blocks 805 and 810, respectively. Subroutine 800 then ends in block 899, returning the modified sets of known hypercube parents A and B.

Figure 9:
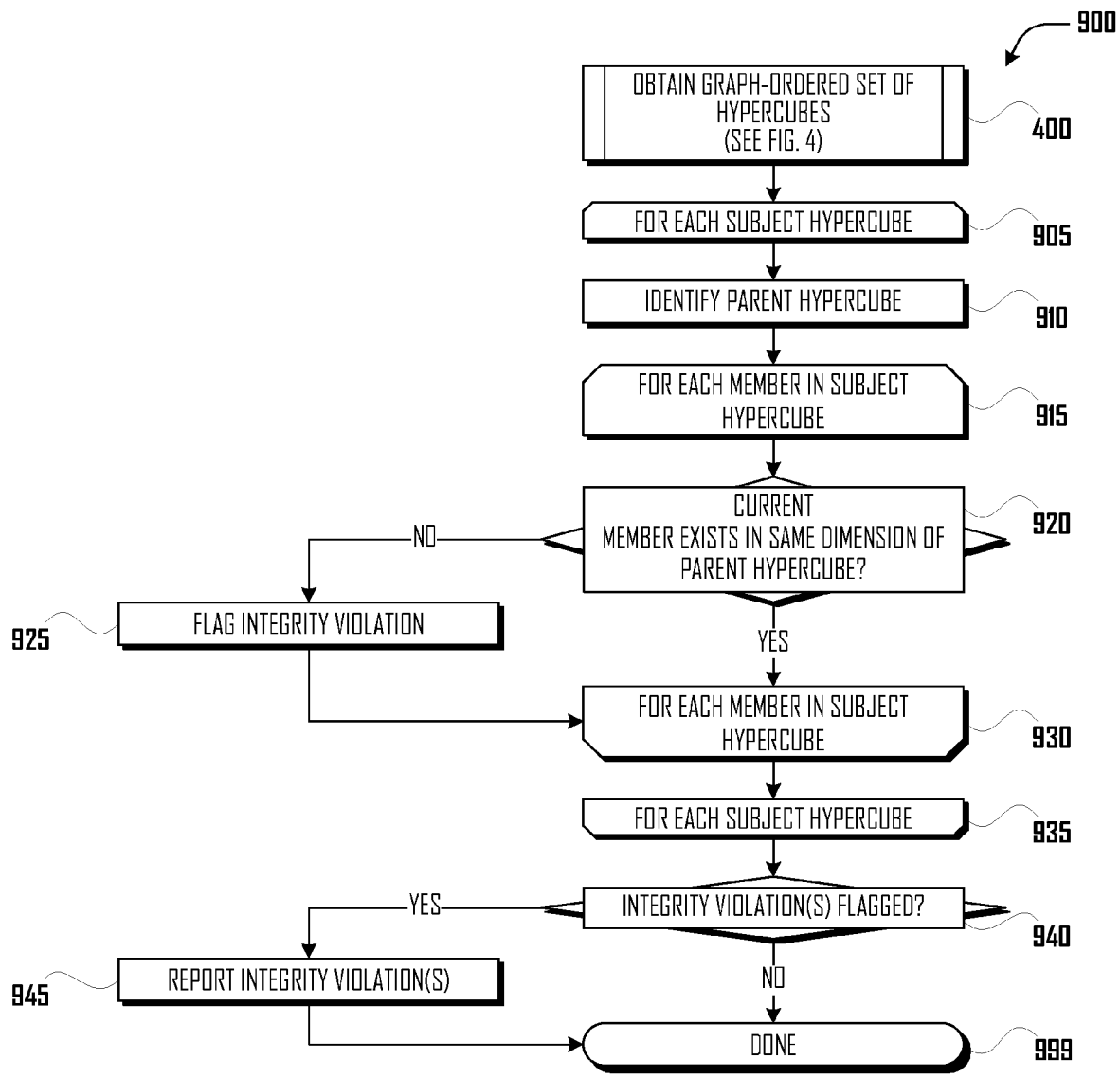
FIG. 9 illustrates a dimensional integrity validation routine in accordance with one embodiment.

FIG. 9 illustrates a dimensional integrity validation routine 900 in accordance with one embodiment. In subroutine block 400, routine 900 obtains a graph-ordered set of hypercubes from subroutine 400 (see FIG. 4, discussed above). Beginning in opening loop block 905, one or more subject hypercubes within the graph-ordered set of hypercubes are processed.

Given the parent-child relationships inherent in the graph-ordered set of hypercubes, it is possible to identify dimensional relational integrity violations. Generally, dimensional relational integrity is violated when members exist in a hypercube, but not in the same dimension of the hypercube's parent.

Accordingly, in block 910, routine 900 identifies a parent hypercube of the current subject hypercube. Beginning in opening loop block 915, each dimensional member of the current subject hypercube is inspected. In decision block 920, routine 900 determines whether the current dimensional member exists in the same dimension of the identified parent hypercube. If so, routine loops back from block 930 to block 915 to inspect the next dimensional member of the current subject hypercube (if any). Otherwise, if routine 900 determines that the current dimensional member does not exist in the same dimension of the identified parent hypercube, then in block 925, routine 900 flags an integrity violation.

For example, suppose routine 900 is validating the dimensional integrity of the following data in Model Hypercube 345 (which is a child of Plant Hypercube 320).

TABLE 6

Dimensional Integrity Violation

| Manu-facturer | Plant Name | Category | Model | Package | Date |
|---|---|---|---|---|---|
| Evil Electrics | Brownfield | Coupe | RoadCruiser | Bruiser | Oct. 31, 2009 |

In Table 6, dimensional integrity is violated because a member ("Brownfield") exists in the "Evil Electrics" Manufacturer dimension of Model Hypercube 345, but the parent (Plant Hypercube 320) does not have a corresponding member in the "Evil Electrics" Manufacturer dimension. In other words, using the parent-child relationships inherent in the tree-ordered set of hypercubes, it can be automatically determined that the "Evil Electrics" manufacturer does not operate a "Brownfield" plant; therefore, there is an integrity violation in the data presented in Table 6. In some embodiments, "dimensional integrity" may be analogized to foreign key referential integrity in a relational data model.

In ending loop block 935, routine 900 iterates back to block 905 to process the next subject hypercube (if any). Once all subject hypercubes have been processed, in decision block 940, routine 900 determines whether one or more integrity violations were flagged upon processing of one or more subject hypercubes. If so, then in block 945, routine 900 reports the integrity violations. In one embodiment, reporting integrity violations may include presenting an interface with which a user can inspect and/or correct integrity violations and/or the causes thereof. In other embodiments, reporting integrity violations may simply include highlighting offending fields in a data display, creating a dimensional integrity report, and the like. Routine 900 ends in block 999.

Figure 10:
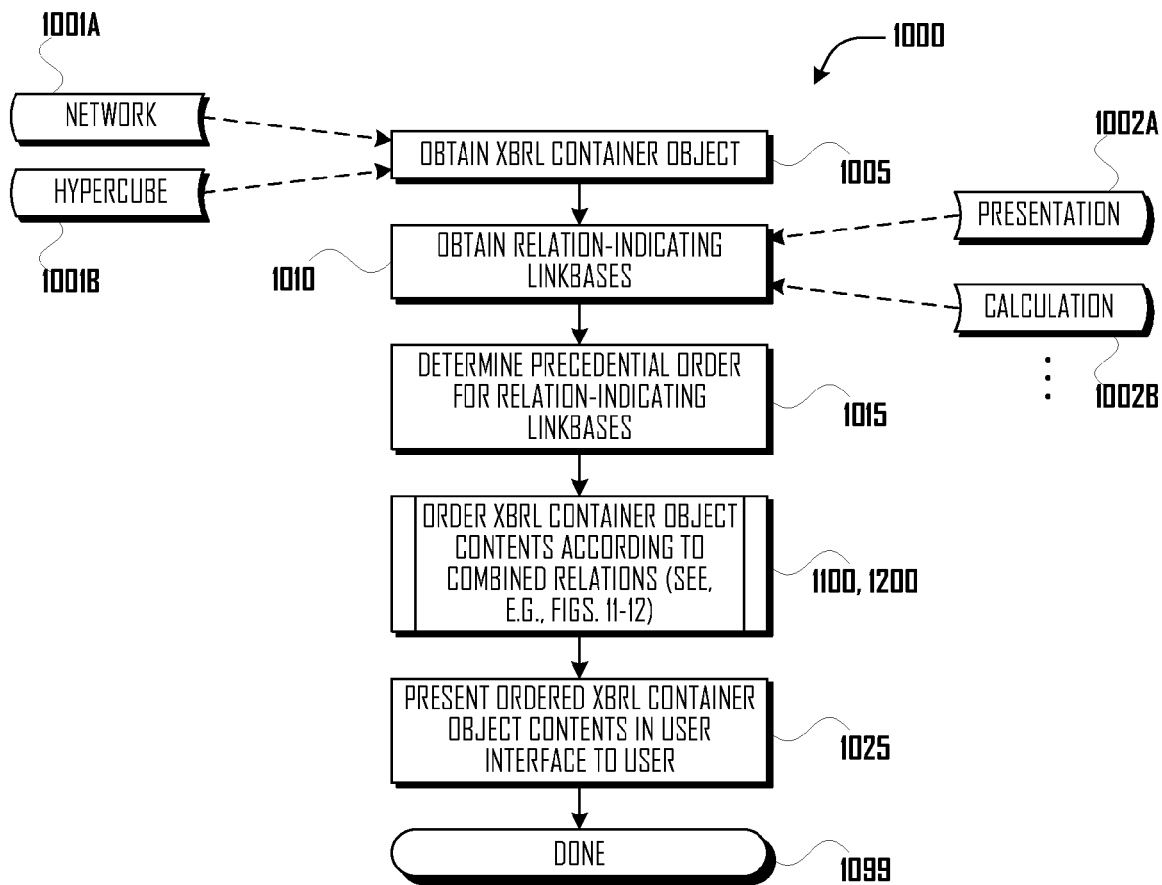
FIG. 10 illustrates an XBRL container object presentation routine in accordance with one embodiment.

FIG. 10 illustrates an XBRL container object presentation routine 1000 in accordance with one embodiment. When XBRL users design taxonomies, they typically have a particular "view" in mind. More often than not, this view is a financial statement that originated in a spreadsheet or word-processing application. At the present time, the state of the art is to "hard-code" one or more particular views to be associated with a particular network of hypercubes from which the view can be populated with data. In some other cases, a presentation linkbase can describe an order in which a view should present various pieces of information. This approach can work well enough for non-dimensional data, but it can become confusing as dimensions are added. Indeed, in practice, many presentation linkbases are riddled with inconsistencies and outright errors.

A "hard-coded" view may be acceptable for the author of the taxonomy or instance. However, in various embodiments, one can create many isomorphic views of a hypercube by treating the hypercube as representing a mathematical set of data.

In block 1005, routine 1000 obtains an XBRL container object, such as network 1001A (which contains two or more hypercubes) or hypercube 1001B (which contains two or more dimensions, dimensional members, and/or primary items).

For example, a network (such as a "Balance Sheet") often has many Extended Links. For example, a Balance Sheet network may include one or more hypercubes, a presentation linkbase, a calculation linkbase, and the like. Hypercubes typically include a set of primary items (concepts, analogized above to non-key columns, that can be conceived as describing the names of the "cells" for actual fact data values). The primary items of a hypercube of a network can be listed in different orders in each Extended Link. Generally speaking, XBRL users consider that the presentation links list the preferred order of presenting a set of concepts. (As the term is used herein, dimensions, members, and primary items are all "concepts" that is, they are all literally "derived" from "concept" in the object inheritance sense.)

In some embodiments, the contents of the XBRL container object may initially be organized and/or ordered in some way. For example, in one embodiment, routine 1000 may obtain a network including a graph-ordered set of hypercubes, such as may have been generated by subroutine 400 (see FIG. 4, discussed above). Similarly, in some embodiments, routine 1000 may obtain a hypercube containing a set of concepts that are defined in a default order in the hypercube. However, as discussed below, various additional sources of ordering information may be considered to determine an improved presentation order for the contents of the XBRL container object.

In block 1010, routine 1000 obtains two or more relation-indicating linkbases, such as presentation linkbase 1002A, calculation linkbase 1002B, or any other linkbase that may include relation information (e.g., parent/child/sibling) from which the contents of the XBRL container object obtained in block 1005 can be ordered.

As mentioned above, a presentation linkbase is often used to guide a presentation and/or visualization of concepts in a network. However, in many networks, there may be no presentation linkbase. Furthermore, in some networks, a presentation linkbase may include concepts that are not in the hypercube or visa versa. Moreover, a calculation linkbase (for example) may include concepts that are not in the presentation linkbase and/or the hypercube. In other words, in many networks, determining a presentation and/or visualization of concepts can be difficult due to inconsistencies and/or missing information among the Extended Links in the network.

Nonetheless, in some embodiments, routine 1000 may determine a presentation and/or visualization of concepts in a network despite inconsistencies and/or missing information among the Extended Links in the network by generating a combined set of concept relations based on relation information in two or more ordered relation-indicating linkbases, as discussed further below.

In block 1015, routine 1000 determines a precedential order for the two or more relation-indicating linkbases. For example, in one embodiment, a presentation linkbase may be considered the best (highest precedence) source of ordering information for the contents of the XBRL container object, with a calculation linkbase being the next best (next lower precedence) source of ordering information, followed by any other linkbases in the XBRL network.

In subroutine block 1100 or, alternately, subroutine block 1200 (see FIGS. 11-12, discussed below), routine 1000 obtains a presentation-ordered set of the contents of the XBRL container object (e.g., a presentation-ordered set of hypercubes of an XBRL network, a presentation-ordered set of concepts of a hypercube, and the like).

In block 1025, routine 1000 presents the presentation-ordered set of hypercubes. In some embodiments, the presentation may represent a static view of the hypercube data. In other embodiments, the presentation may include a wizard or other interactive interface that allows one to enter, validate, and/or manipulate data associated with a hypercube.

In some embodiments, the presentation uses one or more predetermined view-types, which may include some or all of the following:

(1) 2-dimensional flat table of cells—concepts down one side, one set of dimension members across the top, facts in cells;

(2) n-dimensional table of tables—concepts down one side, dimension table across the top, fact tables in the cells;

(3) n-dimensional table of table—concepts down one side, dimension table across the top, dimension members and facts in the cell;

(4) flat sparse table—concepts down one side, dimensions first with the members down the list, value cells in the last column;

(5) flat unparsed table—concepts down one side, dimensional values represented down the next columns, values in the last column;

(6) tab view—tabs for the highest dimensions that have multiple values; within a tab, values can be displayed in formats 1-5 (above);

(7) multi-tab view—more than one dimension gets a row of tabs.

In addition, slicers can be applied to such views if they have multiple dimensions and dimensional members. In some embodiments, slicers on typed dimensions may include a user-completed input box. Moreover, in some embodiments, such views can have the concepts and dimensions switched or intermixed, and views can be filtered with a slicer that sets dimension partition, value, or all dimensional members.

In some embodiments, more than one isomorphic view of a hypercube may be presented. For example, Table 4: Production Breakdown by Model and Data (Model Hypercube), above, presents an isomorphic view of Table 7: Sliced Breakdown by Model, below. In other words, both Table 4 and Table 7 represent exactly the same data.

TABLE 7

Sliced Breakdown by Model
Manufacturer (All)
Plant Name (All)

| Sum of Quantity Produced | | Date | | | |
|---|---|---|---|---|---|
| Model | Package | Oct. 31, 2010 | Nov. 30, 2010 | Dec. 31, 2010 | Grand Total |
| Flash | DX | 600 | 660 | 552 | 1812 |
|  | QX | 300 | 330 | 276 | 906 |
| Flash Total |  | 900 | 990 | 828 | 2718 |
| RoadCruiser | Bruiser | 600 | 660 | 552 | 1812 |
|  | Snoozer | 300 | 330 | 276 | 906 |
| RoadCruiser Total |  | 900 | 990 | 828 | 2718 |
| SnowMaster | 3500 | 300 | 345 | 264 | 909 |
| SnowMaster Total |  | 300 | 345 | 264 | 909 |
| Grand Total |  | 2100 | 2325 | 1920 | 6345 |

In some embodiments, isomorphic views may be constructed using a hypercube's "fact table." A fact table is a set of all facts in the hypercube, each dimensionally qualified. Fact tables are "square" in that the columns are dimensions, the rows represent fact values, and the cells represent dimensional members (or for typed dimensions, the lexical or inferred value). In various embodiments, a user may "filter" a set of facts by selecting a particular value for a given dimension. If every dimension were filtered, the resulting view would include exactly one (or zero) fact. In various embodiments, dimensional filters may be represented in different ways, including as a "slicer" (similar to an "AutoFilter" in a spreadsheet table); a tab (one for each dimensional member); a row or column heading (e.g., for n-dimensional table of table representations); and the like. Such views are isomorphic because the user could, for example, move a tab to a slicer, take all of the values in a slicer and move them to a column heading, and the like.

In some embodiments, one or more homomorphic views may also be available. For example, Table 8, below, does not present an isomorphic view of Table 4 or Table 7 because Table 8 lacks data (no slicers, for example) from which Table 4 or Table 7 could be created.

TABLE 8

Total by Manufacturer

| Sum of Quantity Produced | Date | | | |
|---|---|---|---|---|
| Manufacturer | Oct. 31, 2010 | Nov. 30, 2010 | Dec. 31, 2010 | Grand Total |
| Evil Electrics | 900 | 990 | 828 | 2718 |
| Goulish Gassers | 1200 | 1335 | 1092 | 3627 |
| Grand Total | 2100 | 2325 | 1920 | 6345 |

In some embodiments, homomorphic views may be constructed be representing dimensional members and/or concepts as trees. Such trees may then be "pruned" in various ways to obtain meaningful homomorphic views. For example, a tree may be pruned to show only the "roots" of the tree. For another example, a tree may be pruned to show the top n layers of one or more dimensional members and/or concepts to provide a "Top of the world" view. Using the exemplary data referenced above, a tree may be pruned to show, for example, the total number of coupes built at each plant, and nothing more.

In some embodiments, a presentation may include a "summary" of a hypercube and/or a network. A summary for a hypercube is the set of all facts tied to that hypercube that have a default value for every dimension. In the case of no hypercube or an empty hypercube, the summary is the set of facts defined by the concepts in the corresponding presentation which have no dimensions specified (such as is often the case for financial statements). The summary for a network is the set of all facts for concepts in that network that have either no hypercube attached or have a default value for every dimension. In some cases, concepts may be located via the presentation or other linkbase (especially if there are no hypercubes). In some cases, the set of concepts described above can result in the empty set, in which case no summary may be available.

In some embodiments, the presentation may include a user interface allowing the user to alternately select some or all of such views. In some embodiments, the initial or default view may be chosen adaptively based on characteristics of the data. For example, if there are typed dimensions (e.g., user specified sets of strings, numbers, dates), the default view may be the flat sparse table. If there are zero dimensions, the default view may be the 2-dimensional flat table of cells or a summary view. If there is at most one dimension with multiple dimensional-values, the default view may be the 2-dimensional flat table of cells or the tab view. If each concept has exactly one fact value, the default view may be the flat sparse table. Otherwise, in one embodiment, the user may select his or her desired view. Additionally, in some embodiments, if a view has more than a small number (e.g. five) dimension values, slicers may be preferred in the view for that dimension.

Furthermore, in some embodiments, clustering algorithms, such as k-means, may be applied to pick between the views and to select which dimensions to slice and at which ply or value to set the slicers. In some embodiments, the clustering algorithms may employ weights that (for example) minimize black space, minimize sliders, minimize the maximum practical number of cells to display, maximize coverage in the fewest practically displayable views, and the like.

In some embodiments, the data of an instance can be clustered along a fixed view to determine that it is N instances of related data. The data may then be displayed as siblings using, for example, tabs or trees. Such clustering may have a weighting algorithm that includes similarity of fact dimensions or concepts and a fact that points to the parent hypercube and unique ids.

In some embodiments, user actions may be observed to determine, modify, and/or improve the organization of the hypercubes, the order of the concepts, and/or the best view for each. For example, if the user most frequently picks a particular one of the offered views, that particular view may be made the default for the hypercube in question; if the user frequently sets a particular dimensional member slicer at a particular ply, that particular dimensional member slicer can be made the default for the hypercube in question; and/or if the user frequently slices on a particular dimension, that particular dimension can be made the default to slice.

Similarly, in some embodiments, the presentation may include a control or other user interface element with which a user can enter meta-data or otherwise indicate that some or all of the relationships presented in the presentation-ordered hypercube or set of hypercubes should be further refined, corrected, and/or altered.

Routine 1000 ends in block 1099.

Figure 11:
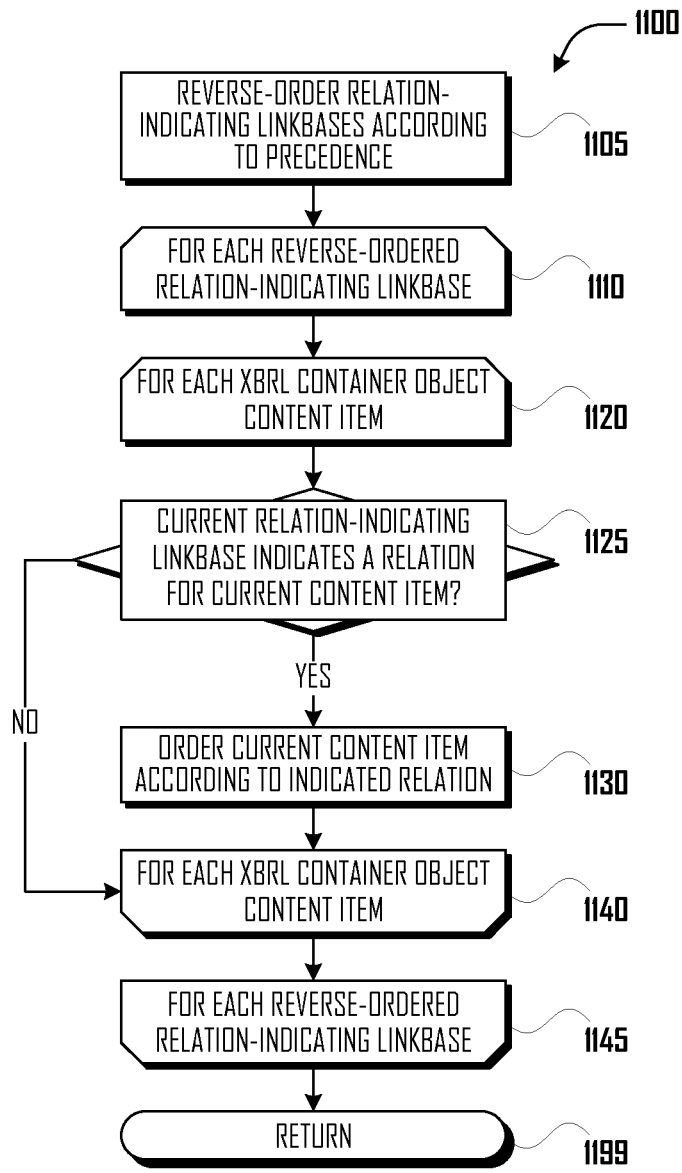
FIGS. 11-12 illustrate XBRL container object contents presentation-ordering subroutines in accordance with various embodiments.

FIG. 11 illustrates a subroutine 1100 for presentation-ordering the contents of an XBRL container object, in accordance with one embodiment. Subroutine 1100 determines a presentation order for the contents of an XBRL container object (e.g., a network, a hypercube, or the like), given two or more precedentially ordered relation-indicating linkbases, each of which defines a set of concept relations related to the contents of the XBRL container object.

In block 1105, subroutine 1100 puts the two or more relation-indicating linkbases into reverse order of precedence, such that subroutine 1100 will process the linkbase having the lowest precedence first when, in opening loop block 1110, subroutine 1100 begins processing each relation-indicating linkbase in turn, ultimately ordering the contents of the XBRL container object contents according to a combination of relations defined in the two or more relation-indicating linkbases.

Beginning in opening loop block 1120, subroutine 1100 processes each content item (e.g., each hypercube or each concept) in the XBRL container object. In decision block 1125, subroutine 1100 determines whether the current relation-indicating linkbase indicates a relation associated with the current content item. For example, the current relation-indicating linkbase may indicate that the current hypercube or concept is a parent/child/sibling of another hypercube or concept.

If the current relation-indicating linkbase is determined to indicate a relation associated with the current content item, then in block 1130, subroutine 1100 orders the current content item according to the indicated relation. Otherwise, subroutine 1100 skips to closing loop block 1140.

In closing loop block 1140, subroutine 1100 iterates back to block 1120 to process the next content item of the XBRL container object (if any). In closing loop block 1145, subroutine 1100 iterates back to block 1110 to process the next relation-indicating linkbase (if any). Once the contents of the XBRL container object have been ordered according to a combined group of relations indicated in the two or more relation-indicating linkbases, subroutine 1100 ends in block 1199.

Figure 12:
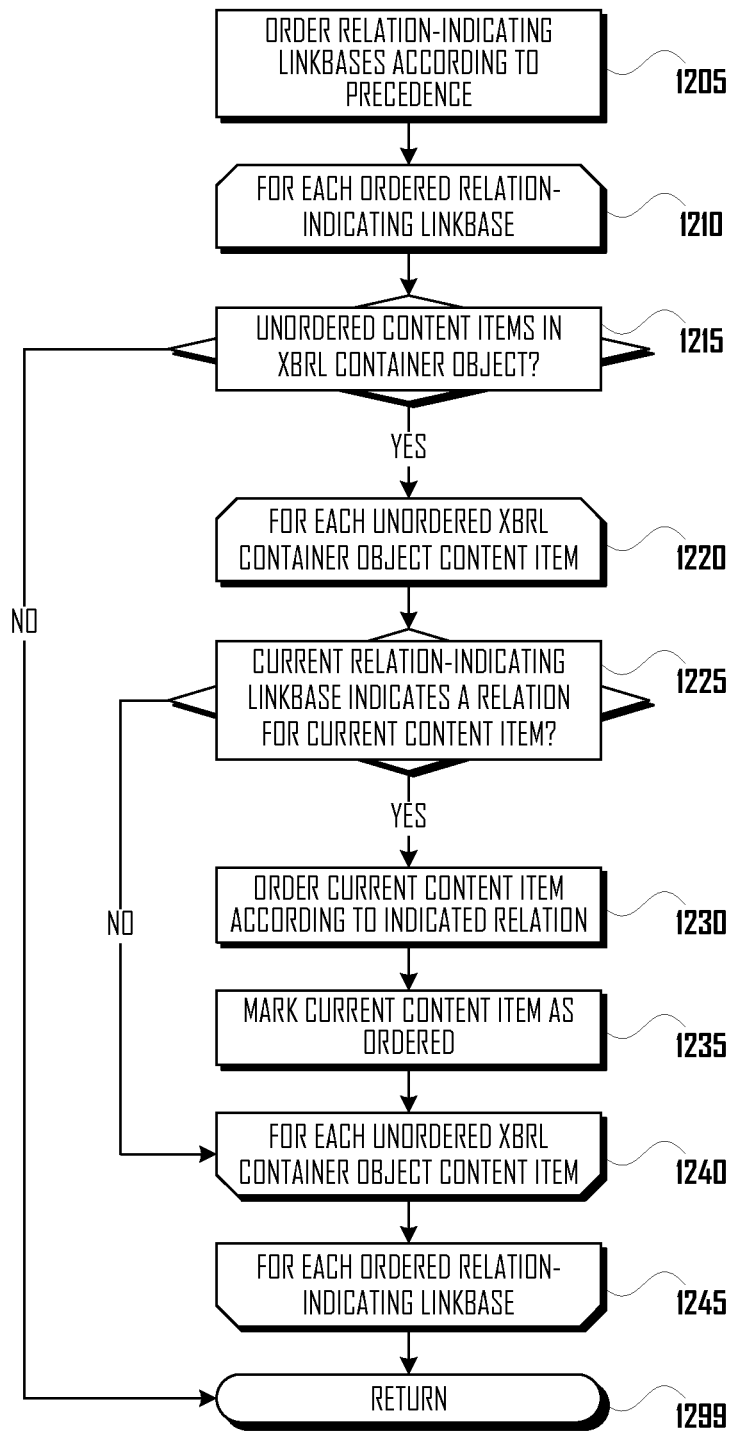

FIG. 12 illustrates an alternative subroutine 1200 for presentation-ordering the contents of an XBRL container object, in accordance with one embodiment. Subroutine 1200 determines a presentation order for the contents of an XBRL container object (e.g., a network, a hypercube, or the like), given two or more precedentially ordered relation-indicating linkbases, each of which defines a set of concept relations related to the contents of the XBRL container object.

In block 1205, subroutine 1200 puts the two or more relation-indicating linkbases into order of precedence, such that subroutine 1200 will process the linkbase having the highest precedence first when, in opening loop block 1210, subroutine 1200 begins processing each relation-indicating linkbase in turn, ultimately ordering the contents of the XBRL container object contents according to a combination of relations defined in the two or more relation-indicating linkbases.

In decision block 1215, subroutine 1200 determines whether the XBRL container object includes content items that have yet to be ordered. If not, then all content items have been ordered and subroutine 1200 ends in block 1299.

Otherwise, beginning in opening loop block 1220, subroutine 1200 processes each unordered content item (e.g., each hypercube or each concept) in the XBRL container object. In decision block 1225, subroutine 1200 determines whether the current relation-indicating linkbase indicates a relation associated with the current content item. For example, the current relation-indicating linkbase may indicate that the current hypercube or concept is a parent/child/sibling of another hypercube or concept.

If the current relation-indicating linkbase is determined to indicate a relation associated with the current content item, then in block 1230, subroutine 1200 orders the current content item according to the indicated relation, and in block 1235, subroutine 1200 marks the current content item as having been ordered. Otherwise, subroutine 1200 skips to closing loop block 1240.

In closing loop block 1240, subroutine 1200 iterates back to block 1220 to process the next content item of the XBRL container object (if any). In closing loop block 1245, subroutine 1200 iterates back to block 1210 to process the next relation-indicating linkbase (if any). Once the contents of the XBRL container object have been ordered according to a combined group of relations indicated in the two or more relation-indicating linkbases, subroutine 1200 ends in block 1299.

Figure 13:
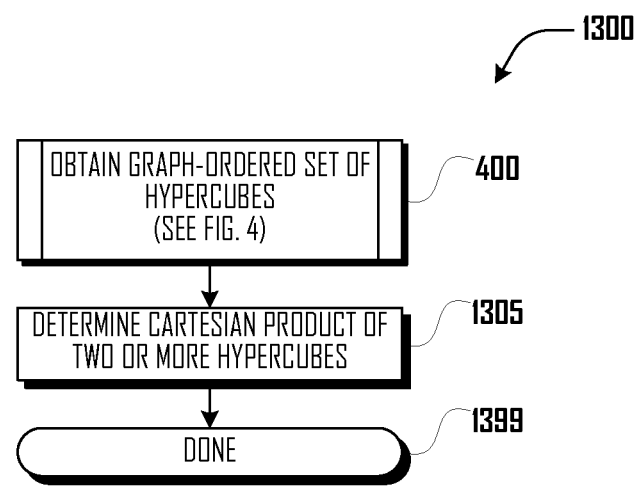
FIG. 13 illustrates a hypercube join routine in accordance with one embodiment.

FIG. 13 illustrates a hypercube join routine 1300 in accordance with one embodiment. In some embodiments, an ordered set of hypercubes can be "joined," analogous to (inner) joining SQL tables. Routine 1300 obtains a graph-ordered set of hypercubes for a network in subroutine block 400 (see FIG. 4, discussed above). In block 1305, routine 1300 determines the Cartesian product of rows from two or more of the ordered hypercubes. For example, "joining" the Manufacturer and Plant Hypercubes (see respectively Table 1 and Table 2, above) creates the Cartesian product of the rows, as illustrated in Table 9, below. Conversely, in other embodiments, an ordered hypercube could also be "split," which could be considered the equivalent of a slice, as discussed above.

TABLE 9

Joined Manufacturer and Plant Hypercubes

| Manufacturer | | Plant Name | Plant Address | Plant Manager |
|---|---|---|---|---|
| Evil Electrics | 20 Current Drive | Lightning | 1 Georgia Way | Anne |
| Evil Electrics | 20 Current Drive | Amped | 100 Nowhere | Frank |
| Goulish Gassers | 1 Smog Lane | Brownfield | 1 Pavement Drive | Alice |
| Goulish Gassers | 1 Smog Lane | Greenland | 1 Concrete Heaven | Joe |
| Goulish Gassers | 1 Smog Lane | Brownfield | 1 Pavement Drive | Alice |

Although specific embodiments have been illustrated and described herein, it will be appreciated by those of ordinary skill in the art that a whole variety of alternate and/or equivalent implementations may be substituted for the specific embodiments shown and described without departing from the scope of the present disclosure. This application is intended to cover any adaptations or variations of the embodiments discussed herein.

What is claimed is:

1. A computer-implemented method for automatically determining the existence of a parent/child relationship between a first eXtensible Business Reporting Language ("XBRL") hypercube and a second XBRL hypercube, the method comprising:
    obtaining, by the computer, a first XBRL hypercube definition defining the first XBRL hypercube as comprising a first set of XBRL dimensions and a first set of XBRL dimensional members;
    obtaining, by the computer, a second XBRL hypercube definition defining the second XBRL hypercube as comprising a second set of XBRL dimensions and a second set of XBRL dimensional members;
    determining, by the computer based on said first and said second XBRL hypercube definitions, whether the second set of XBRL dimensions is a proper subset of the first set of XBRL dimensions;
    determining, by the computer based on said first and said second XBRL hypercube definitions, whether the second set of XBRL dimensional members is a subset of the first set of XBRL dimensional members; and
    when the first set of XBRL dimensions is determined to be a proper subset of the second set of XBRL dimensions, and when the first set of XBRL dimensional members is determined to be a subset of the second set of XBRL dimensional members, generating, by the computer, a parent-relationship data structure indicating that the second XBRL hypercube is a parent of the first XBRL hypercube.

2. The method of claim 1, further comprising:
    determining, based on said first XBRL hypercube definition, a first count of XBRL dimensions included in said first set of XBRL dimensions;
    determining, based on said second XBRL hypercube definition, a second count of XBRL dimensions included in said second set of XBRL dimensions; and
    when said first and said second counts are both zero, generating a sibling-relationship data structure indicating that the first and the second XBRL hypercubes are siblings.

3. The method of claim 1, further comprising, when the first set of XBRL dimensions is determined to not be a proper subset of the second set of XBRL dimensions, or when the first set of XBRL dimensional members is determined to not be a subset of the second set of XBRL dimensional members:
    determining a first set of parent hypercubes of the first XBRL hypercube;
    determining a second set of parent hypercubes of the second XBRL hypercube; and
    when said first and said second sets of parent hypercubes are both empty, generating a sibling-relationship data structure indicating that the first and the second XBRL hypercubes are siblings.

4. The method of claim 1, further comprising, when the first set of XBRL dimensions is determined to not be a proper subset of the second set of XBRL dimensions, or when the first set of XBRL dimensional members is determined to not be a subset of the second set of XBRL dimensional members:
    determining a first set of parent hypercubes of the first XBRL hypercube;
    determining a second set of parent hypercubes of the second XBRL hypercube;
    determining an intersection set of said first and said second sets of parent hypercubes; and
    when said intersection set includes a shared parent hypercube of said first and said second XBRL hypercube, generating a sibling-relationship data structure indicating that the first and the second XBRL hypercubes are siblings with respect to said shared parent hypercube.

5. The method of claim 4, further comprising:
    determining an intersection set of said first and said second sets of XBRL dimensions, said intersection set including one or more shared XBRL dimensions;
    determining that no hypercube is explicitly defined whose dimensions consist of said one or more shared XBRL dimensions; and
    generating a data structure representing an implied parent hypercube whose dimensions consist of said one or more shared XBRL dimensions; and
    wherein said intersection set of said first and said second sets of parent hypercubes includes said implied parent hypercube.

6. The method of claim 1, further comprising:
    determining a set of one or more parent hypercubes of the first XBRL hypercube;
    when said set of parent hypercubes includes at least two parent hypercubes, generating a association-hypercube data structure indicating that the first XBRL hypercube is an association hypercube.

7. The method of claim 1, wherein obtaining said second XBRL hypercube definition comprises:
    obtaining a definition of an XBRL concept;
    determining that said XBRL concept is not associated with any explicitly-defined hypercube; and
    generating an implicit XBRL hypercube definition comprising said XBRL concept, said second set of XBRL dimensions, and said second set of XBRL dimensional members, wherein said second set of XBRL dimensions consists of zero XBRL dimensions, and wherein said second set of XBRL dimensional members consists of zero XBRL dimensional members.

8. A non-transient computer-readable medium having tangibly stored thereon instructions that, when executed by a processor, configure the processor to perform a method for automatically determining the existence of a parent/child relationship between a first eXtensible Business Reporting Language ("XBRL") hypercube and a second XBRL hypercube, the method comprising:

obtaining a first XBRL hypercube definition defining the first XBRL hypercube as comprising a first set of XBRL dimensions and a first set of XBRL dimensional members;

obtaining a second XBRL hypercube definition defining the second XBRL hypercube as comprising a second set of XBRL dimensions and a second set of XBRL dimensional members;

determining, based on said first and said second XBRL hypercube definitions, whether the second set of XBRL dimensions is a proper subset of the first set of XBRL dimensions;

determining, based on said first and said second XBRL hypercube definitions, whether the second set of XBRL dimensional members is a subset of the first set of XBRL dimensional members; and when the first set of XBRL dimensions is determined to be a proper subset of the second set of XBRL dimensions, and when the first set of XBRL dimensional members is determined to be a subset of the second set of XBRL dimensional members, generating a parent-relationship data structure indicating that the second XBRL hypercube is a parent of the first XBRL hypercube.

9. A computing apparatus comprising a processor and a memory having stored thereon instructions that, when executed by the processor, configure the apparatus to perform a method for automatically determining the existence of a parent/child relationship between a first eXtensible Business Reporting Language ("XBRL") hypercube and a second XBRL hypercube, the method comprising:

obtaining a first XBRL hypercube definition defining the first XBRL hypercube as comprising a first set of XBRL claim dimensions and a first set of XBRL dimensional members;

obtaining a second XBRL hypercube definition defining the second XBRL hypercube as comprising a second set of XBRL dimensions and a second set of XBRL dimensional members;

determining, based on said first and said second XBRL hypercube definitions, whether the second set of XBRL dimensions is a proper subset of the first set of XBRL dimensions;

determining, based on said first and said second XBRL hypercube definitions, whether the second set of XBRL dimensional members is a subset of the first set of XBRL dimensional members; and when the first set of XBRL dimensions is determined to be a proper subset of the second set of XBRL dimensions, and when the first set of XBRL dimensional members is determined to be a subset of the second set of XBRL dimensional members, generating a parent-relationship data structure indicating that the second XBRL hypercube is a parent of the first XBRL hypercube.

10. A computer-implemented method for automatically determining a relationship graph for a plurality of eXtensible Business Reporting Language ("XBRL") hypercubes, each XBRL hypercube comprising a set of XBRL dimensions, the method comprising:

obtaining, by the computer, XBRL data comprising a plurality of XBRL hypercube definitions and a plurality of XBRL dimension definitions, collectively corresponding to the plurality of XBRL hypercubes;

obtaining, by the computer, a plurality of hypercube relationship rules according to which a parent/child relationship between a given pair of XBRL hypercubes may be determined to exist or not exist, based at least in part on whether said given pair of XBRL hypercubes share at least one XBRL dimension; and generating, by the computer, a graph data structure defining a plurality of relationships among the plurality of XBRL hypercubes, said plurality of relationships comprising a plurality of parent/child relationships, said graph data structure being generated according to said plurality of hypercube relationship rules, said plurality of XBRL hypercube definitions, and said plurality of XBRL dimension definitions.

11. The method of claim 10, further comprising:
obtaining XBRL presentation data associated with the plurality of XBRL hypercubes;
identifying a plurality of sibling XBRL hypercubes according to said graph data structure;
determining whether said XBRL presentation data specifies a presentation order associated with said plurality of sibling XBRL hypercubes; and
when said XBRL presentation data specifies said presentation order, re-ordering said plurality of sibling XBRL hypercubes in said graph data structure according to said presentation order.

12. The method of claim 10, further comprising:
identifying at least one dimensional integrity violation in said XBRL data based at least in part on said plurality of relationships among the plurality of XBRL hypercubes; and
reporting said at least one dimensional integrity violation to a user.

13. The method of claim 12, wherein identifying said at least one dimensional integrity violation comprises:
selecting, according to said graph data structure, a child XBRL hypercube from the plurality of XBRL hypercubes, said child XBRL hypercube comprising a first XBRL dimension, said first XBRL dimension comprising a first XBRL dimensional member;
identifying, according to said graph data structure, a parent XBRL hypercube of said child XBRL hypercube;
selecting, from a set of XBRL dimensions that comprise said parent XBRL hypercube, a second XBRL dimension that corresponds to said first XBRL dimension;
determining whether said second XBRL dimension includes said first XBRL dimensional member; and
when said second XBRL dimension does not include said first XBRL dimensional member, flagging a dimensional integrity violation corresponding to said child XBRL hypercube and said first XBRL dimensional member.

14. A non-transient computer-readable medium having tangibly stored thereon instructions that, when executed by a processor, configure the processor to perform a method for automatically determining a relationship graph for a plurality of eXtensible Business Reporting Language ("XBRL") hypercubes, each XBRL hypercube comprising a set of XBRL dimensions, the method comprising:

obtaining XBRL data comprising a plurality of XBRL hypercube definitions and a plurality of XBRL dimension definitions, collectively corresponding to the plurality of XBRL hypercubes;

obtaining a plurality of hypercube relationship rules according to which a parent/child relationship between a given pair of XBRL hypercubes may be determined to exist or not exist, based at least in part on whether said given pair of XBRL hypercubes share at least one XBRL dimension; and generating a graph data structure defining a plurality of relationships among the plurality of XBRL hypercubes, said plurality of relationships comprising a plurality of parent/child relationships, said graph data structure being generated according to said plurality of hypercube relationship rules, said plurality of XBRL hypercube definitions, and said plurality of XBRL dimension definitions.

15. A computing apparatus comprising a processor and a memory having stored thereon instructions that, when executed by the processor, configure the apparatus to perform a method for automatically determining a relationship graph for a plurality of eXtensible Business Reporting Language ("XBRL") hypercubes, each XBRL hypercube comprising a set of XBRL dimensions, the method comprising:

obtaining XBRL data comprising a plurality of XBRL hypercube definitions and a plurality of XBRL dimension definitions, collectively corresponding to the plurality of XBRL hypercubes;

obtaining a plurality of hypercube relationship rules according to which a parent/child relationship between a given pair of XBRL hypercubes may be determined to exist or not exist, based at least in part on whether said given pair of XBRL hypercubes share at least one XBRL dimension; and generating a graph data structure defining a plurality of relationships among the plurality of XBRL hypercubes, said plurality of relationships comprising a plurality of parent/child relationships, said graph data structure being generated according to said plurality of hypercube relationship rules, said plurality of XBRL hypercube definitions, and said plurality of XBRL dimension definitions.

16. A computer-implemented method for automatically presentation-ordering a plurality of concepts of an eXtensible Business Reporting Language ("XBRL") hypercube, the method comprising:

obtaining, by the computer, an XBRL hypercube definition defining the XBRL hypercube as comprising the plurality of XBRL concepts;

obtaining, by the computer, a first plurality of concept relations associated with a first nonempty subset of the plurality of XBRL concepts and a second plurality of concept relations associated with a second nonempty subset of the plurality of XBRL concepts;

determining, by the computer, an order of precedence deeming one of said first and second pluralities of concept relations as precedential over the other;

ordering, by the computer, the plurality of XBRL concepts according to a combined plurality of concept relations, said combined plurality of concept relations being automatically determined according to said first and said second pluralities of concept relations and said order of precedence, said combined plurality of concept relations differing from said first plurality of concept relations and from said second plurality of concept relations; and providing, by the computer, a user interface presenting said ordered plurality of XBRL concepts to a user.

17. The method of claim 16, wherein said first plurality of concept relations are associated with an XBRL presentation network associated with the XBRL hypercube, and said second plurality of concept relations are associated with an XBRL non-presentation network associated with the XBRL hypercube.

18. The method of claim 17, wherein said order of precedence deems said first plurality of concept relations associated with said XBRL presentation network as precedential over said second plurality of concept relations associated with said XBRL non-presentation network.

19. The method of claim 16, wherein ordering the plurality of XBRL concepts according to said combined plurality of concept relations comprises:

selecting said first plurality of concept relations as being precedential over said second plurality of concept relations according to said order of precedence;

ordering said first nonempty subset of the plurality of XBRL concepts according to said first plurality of concept relations;

determining whether at least one of the plurality of XBRL concepts remains unordered; and when one or more of the plurality of XBRL concepts are determined to remain unordered, ordering the one or more unordered XBRL concepts according to said second plurality of concept relations.

20. The method of claim 16, wherein ordering the plurality of XBRL concepts according to said combined plurality of concept relations comprises:

selecting said first plurality of concept relations as being precedential over said second plurality of concept relations according to said order of precedence;

ordering said second nonempty subset of the plurality of XBRL concepts according to said second plurality of concept relations; and then ordering said first nonempty subset of the plurality of XBRL concepts according to said first plurality of concept relations.

21. A non-transient computer-readable medium having tangibly stored thereon instructions that, when executed by a processor, configure the processor to perform a method for automatically presentation-ordering a plurality of concepts of an eXtensible Business Reporting Language ("XBRL") hypercube, the method comprising:

obtaining an XBRL hypercube definition defining the XBRL hypercube as comprising the plurality of XBRL concepts;

obtaining a first plurality of concept relations associated with a first nonempty subset of the plurality of XBRL concepts and a second plurality of concept relations associated with a second nonempty subset of the plurality of XBRL concepts;

determining an order of precedence deeming one of said first and second pluralities of concept relations as precedential over the other;

ordering the plurality of XBRL concepts according to a combined plurality of concept relations, said combined plurality of concept relations being automatically determined according to said first and said second pluralities of concept relations and said order of precedence, said combined plurality of concept relations differing from said first plurality of concept relations and from said second plurality of concept relations; and providing a user interface presenting said ordered plurality of XBRL concepts to a user.

22. A computing apparatus comprising a processor and a memory having stored thereon instructions that, when executed by the processor, configure the apparatus to perform a method for automatically presentation-ordering a plurality of concepts of an eXtensible Business Reporting Language ("XBRL") hypercube, the method comprising:

obtaining an XBRL hypercube definition defining the XBRL hypercube as comprising the plurality of XBRL claim concepts;

obtaining a first plurality of concept relations associated with a first nonempty subset of the plurality of XBRL concepts and a second plurality of concept relations associated with a second nonempty subset of the plurality of XBRL concepts;

determining an order of precedence deeming one of said first and second pluralities of concept relations as precedential over the other;

ordering the plurality of XBRL concepts according to a combined plurality of concept relations, said combined plurality of concept relations being automatically determined according to said first and said second pluralities of concept relations and said order of precedence, said combined plurality of concept relations differing from said first plurality of concept relations and from said second plurality of concept relations; and providing a user interface presenting said ordered plurality of XBRL concepts to a user.

* * * * *